(12) United States Patent
Adachi et al.

(10) Patent No.: US 8,885,707 B2
(45) Date of Patent: Nov. 11, 2014

(54) IMAGE DECODING APPARATUS AND IMAGE DECODING METHOD

(75) Inventors: Makoto Adachi, Kanagawa (JP); Hiroaki Toida, Osaka (JP); Kiyofumi Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 2051 days.

(21) Appl. No.: 11/887,441

(22) PCT Filed: Mar. 31, 2006

(86) PCT No.: PCT/JP2006/306867
§ 371 (c)(1),
(2), (4) Date: Sep. 28, 2007

(87) PCT Pub. No.: WO2006/106935
PCT Pub. Date: Oct. 12, 2006

(65) Prior Publication Data
US 2009/0141798 A1  Jun. 4, 2009

(30) Foreign Application Priority Data
Apr. 1, 2005  (JP) ................................ 2005-106821

(51) Int. Cl.
*H04N 7/12* (2006.01)
*H04N 19/593* (2014.01)
(Continued)

(52) U.S. Cl.
CPC ... *H04N 19/00933* (2013.01); *H04N 19/00763* (2013.01); *H04N 19/00781* (2013.01);
(Continued)

(58) Field of Classification Search
None
See application file for complete search history.

(56) References Cited

U.S. PATENT DOCUMENTS 7,369,707 B2 * 5/2008 Sakaguchi et al. ............ 382/239
7,706,443 B2 * 4/2010 Chandramouly et al. ....................... 375/240.24
(Continued)

FOREIGN PATENT DOCUMENTS

JP  8-18980  1/1996
(Continued)

OTHER PUBLICATIONS

International Search Report issued Jul. 18, 2006 in the International (PCT) Application of which the present application is the U.S. National Stage.
(Continued)

*Primary Examiner* — Faruk Hamza
*Assistant Examiner* — Aixa A Guadalupe Cruz
(74) *Attorney, Agent, or Firm* — Wenderoth, Lind & Ponack, L.L.P.

(57) ABSTRACT

An image decoding apparatus and an image decoding method capable of generating a decoded image even in the case where a pixel in a block is necessary as a reference pixel, the block where an intra prediction mode specified in a stream is unavailable according to a standard, due to a transmission error, a coding-method error, or the like. An image decoding apparatus determines whether or not a reference block necessary for a specified intra prediction mode is available, based on intra-prediction mode information extracted by an intra-prediction mode extraction unit and peripheral block pixel information stored in a line memory. The image decoding apparatus includes a reference pixel determination unit which controls a switch unit; and a substitute intra-prediction image generation unit which generates a substitute intra-prediction image in the case where a reference block necessary for a specified intra prediction mode is unavailable.

8 Claims, 19 Drawing Sheets

(51) Int. Cl.
*H04N 19/61* (2014.01)
*H04N 19/89* (2014.01)
*H04N 19/44* (2014.01)
*H04N 19/11* (2014.01)
*H04N 19/176* (2014.01)
*H04N 19/46* (2014.01)

(52) U.S. Cl.
CPC ... *H04N 19/00533* (2013.01); *H04N 19/00042* (2013.01); *H04N 19/00278* (2013.01); *H04N 19/00545* (2013.01)
USPC ............. 375/240.12; 375/240; 375/240.01; 375/240.13; 375/240.24; 375/240.25

(56) References Cited

U.S. PATENT DOCUMENTS

| | | | |
|---|---|---|---|
| 2006/0051068 A1 | 3/2006 | Gomila | |
| 2006/0072676 A1* | 4/2006 | Gomila | ............ 375/240.27 |
| 2007/0002948 A1* | 1/2007 | Shibahara et al. | ....... 375/240.12 |

FOREIGN PATENT DOCUMENTS

| | | |
|---|---|---|
| JP | 2001-309388 | 11/2001 |
| JP | 3369573 | 1/2003 |
| JP | 2005-311512 | 11/2005 |
| WO | 2004/064396 | 7/2004 |
| WO | 2004/064397 | 7/2004 |
| WO | 2004/064406 | 7/2004 |

OTHER PUBLICATIONS

ISO/IEC 14496-10 Information technology—Coding of audio-visual objects—Part10: "*Advanced Video Coding*", Section edition, Oct. 1, 2004, pp. 103-114.

ISO/IEC 14496-10 Information technology—Coding of audio-visual objects—Part10: "*Advanced Video Coding*", First edition, Dec. 1, 2003.

* cited by examiner

IMAGE DECODING APPARATUS AND IMAGE DECODING METHOD

TECHNICAL FIELD

The present invention relates to an image decoding apparatus and an image decoding method which decode still picture signals or moving picture signals each of which is generated by dividing a picture into one or more blocks and then coding the block, and a program for executing the method in software.

BACKGROUND ART

In order to store or transmit digital image efficiently, the image has to be compression-coded. Examples of efficient methods of compressing digital image include: JPEG for still pictures; and H.261, H.263, Moving Picture Experts Group (MPEG)-1, MPEG-2, and MPEG-4 for moving pictures. MPEG-4 AVC (Advanced Video Coding), standardized by ISO (International Organization for Standardization) in 2003, aims to improve the performances of MPEG-1 to 4 as well as sharing their technologies.

In the image data coding methods for a moving picture, the following two types of prediction modes are provided: intra picture prediction and inter picture prediction. In MPEG-4 AVC, for example, divided blocks (macroblocks) arranged consecutively within a picture, fall into two groups depending on coding method difference: intra macroblocks and inter macroblocks (see Non-Patent Document 1).

Intra picture prediction is a mode in which a prediction image (intra-prediction image) corresponding to a current block to be coded is generated based on the pixel information on their peripheral blocks within a closed picture so that the difference between the prediction image and its original image is transmitted. Inter picture prediction is a mode in which either or both of the pictures positioned forward and backward of a current picture are specified as reference pictures so that a prediction image in a current block is generated from the reference picture in order to transmit the difference between the prediction image and its original image.

FIG. 1 is a block diagram showing the showing the function and the structure of a conventional image decoding apparatus. As shown in this figure, the conventional image decoding apparatus, which decodes image coded signals each of which is generated by dividing an image into one or more blocks and then coding the block, in order to decode an intra-prediction image, includes a variable-length decode/de-quantization unit 101, an intra-prediction mode extraction unit 102, an intra-prediction image generation unit 103, a line memory 104, and an adder 105.

The conventional image decoding apparatus also decodes an inter-prediction image. However, this function does not relate to a primary feature of the present invention, and its description is omitted in the figure to avoid any confusion.

In the image decoding apparatus having such a configuration, the coded signals, each of which has been generated by dividing an image into one or more blocks and then coding the block, is transformed to differential block image data in a space region by the variable-length decode/de-quantization unit 101, and then outputted to the adder 105.

The intra-prediction mode extraction unit 102 extracts intra-prediction mode information contained in coded signals block by block so as to output the information to the intra-prediction image generation unit 103. The intra-prediction image generation unit 103 obtains reference pixels of a necessary reference block from the line memory 104 according to the extracted intra prediction mode, generates an intra-prediction image block by block, and then outputs the image to the adder 105.

In the adder 105, the intra-prediction image outputted from the intra-prediction image generation unit 103, and the differential block image data outputted from the variable-length decode/de-quantization unit 101, are added together to generate a decoded image.

The decoded image, or equivalently the addition result, is outputted from an output terminal as decoded signals, as well as is stored in the line memory 104 as a reference block image for next intra-prediction image generation.

Hereinafter, a description is given for intra prediction mode, with MPEG-4 AVC Baseline profile taken as an example.

In the intra-prediction image generation method of MPEG-4 AVC luminance signals, the following prediction block units are provided: Intra 16×16 formed from a 16 by 16 matrix of pixel blocks; and Intra 4×4 formed from a 4 by 4 matrix of pixel blocks. Each of the units defines its own intra prediction mode.

FIG. 2 lists Intra 4×4 prediction modes available in MPEG-4 AVC. FIG. 3 shows reference pixels and prediction directions employed for the intra prediction modes shown in FIG. 2.

The reference block is a block containing pixels necessary for intra-prediction image generation in an intra prediction mode specified in a stream (image coded signal). The reference block has already been decoded. The reference block is left-, above-, or upper right/left-adjacent to a current block.

There is shown DC (average value) mode in FIG. 3, in which an intra-prediction image is generated based on the average value of the reference pixels contained in the above-adjacent and left-adjacent reference blocks. In the case where either of the above and left adjacent reference blocks is unavailable, only the pixels of the other available reference block are employed to generate an intra-prediction image. Furthermore, in the case where neither of the above- and left-adjacent reference blocks are available, an intra-prediction image is generated, so that every pixel of the intra-prediction image has a value of 128.

In order to determine whether or not an adjacent reference block is available, MPEG-4 AVC standards define the following three types of blocks unavailable as a reference block: (a) a block not contained in a picture; (b) a block belonging to a slice different from the slice to which a current block to be decoded belongs; and (c) a block inter-picture predicted in the case where an intra prediction-restriction flag in a stream restricts the reference to an inter picture-predicted block.

Non-Patent Document 1: ITU-T Rec.H264|ISO/IEC 14496-10 version 1 "Information technology-Coding of audio-visual objects—Part 10: Advanced video coding"

SUMMARY OF THE INVENTION

Problems that Invention is to Solve

In the case where a pixel in a block is necessary as a reference pixel, the block where an intra prediction mode specified in a stream is unavailable according to a standard, due to a transmission error, a coding-method error, or the like, however, it is impossible to continue an image decoding process.

In light of the above, it is an object of the present invention to provide an image decoding apparatus and an image decoding method capable of generating a decoded image even in the case where a pixel in a block is necessary as a reference pixel, the block where an intra prediction mode specified in a stream is unavailable according to a standard.

Means to Solve the Problems

In order to achieve the above object, an image decoding apparatus which decodes an image coded signal which is generated by dividing an image into one or more blocks and then coding the block, the image decoding apparatus including: an extraction unit operable to extract, from the image coded signals, intra-prediction mode information that indicates which intra-prediction mode among a plurality of intra-prediction modes is used to intra-code a current block; a reference pixel determination unit operable to determine whether or not a reference block necessary for the intra-prediction mode indicated by the intra-prediction mode information is available; and an intra image decoding substitute unit operable to generate a decoded image of the current block, when the reference pixel determination unit determines that the reference block is not available.

This allows a decoded image to be generated even in the case where the pixel in a block is necessary as a reference pixel, the block where an intra prediction mode specified in an image coded signal is unavailable according to standard, due to a coding error, a transmission error, or the like.

Here, the intra image decoding substitute unit may include: a substitute intra-prediction image generation unit operable to generate a substitute intra-prediction image; and a decoded image generation unit operable to generate the decoded image using the substitute intra-prediction image generated by the substitute intra-prediction image generation unit.

Further, the substitute intra-prediction image generation unit may include: an intra-prediction mode switch unit operable to switch an intra-prediction mode used for the current block, from the intra-prediction mode indicated by the intra-prediction mode information to an intra-prediction mode in which an unavailable block is not referred; and an intra-prediction image generation unit operable to generate the substitute intra-prediction image in the intra-prediction mode to which the intra-prediction mode switch unit switches.

Still further, the substitute intra-prediction image generation unit may include: a substitute reference pixel storage unit operable to store a specific pixel value as a reference pixel; and an intra-prediction image generation unit operable to obtain the reference pixel from the substitute reference pixel storage unit, and generate the substitute intra-prediction image using the obtained reference pixel in the intra-prediction mode indicated by the intra-prediction mode information.

Still further, the substitute intra-prediction image storage unit may include a substitute intra-prediction image storage unit operable to store a block image which includes the specific pixel value, wherein the block image stored in the substitute intra-prediction image storage unit is generated as the substitute intra-prediction image.

Still further, the substitute intra-prediction image storage unit may include: a reference pixel compulsory obtainment unit operable to obtain, as the reference pixel, a pixel of the reference block which the reference pixel determination unit determines as unavailable; an intra-prediction image generation unit operable to generate the substitute intra-prediction image using the reference pixel obtained by the reference pixel compulsory obtainment unit, in the intra-prediction mode indicated by the intra-prediction mode information.

This allows an intra-prediction image to be generated and decoding to be continued even in the case where a pixel in a block is necessary as a reference pixel, the block where an intra prediction mode specified in an image coded signal is unavailable, due to a coding error, a transmission error, or the like.

Still further, the intra image decoding substitute unit may includes a substitute decoded image storage unit operable to store a block image which includes a specific pixel value; wherein the block image stored in the substitute decoded image storage unit is outputted as the decoded image.

This allows a decoded signal to be generated thereby continuing an image decoding process even in the case where the pixel in a block is necessary as a reference pixel, the block where an intra prediction mode specified is unavailable based according to a standard, due to a coding error, a transmission error, or the like.

Still further, the image decoding apparatus may further include: a plurality of the intra image decoding substitute units; a substitute switch unit operable to select one of the plurality of the intra image decoding substitute units, and switch the current intra image decoding substitute unit to the selected plurality of the intra image decoding substitute unit.

This configuration selects optimal one from plurality of intra image decoding substitute units thereby generating an optimal decoded image even in the case where a wrong intra prediction mode is specified in an image coded signal, by giving an external input, making an internal determination, or the like, as circumstances demand.

The present invention is achieved not only through such an image decoding apparatus, but also through an image decoding method including characteristic units of the image decoding apparatus as its steps, or through a program for performing the steps by a computer. Needless to say, such a program is available through a recording medium such as a CD-ROM, or a communication medium such as the Internet.

Effects of the Invention

According to the image decoding apparatus and the image decoding method of the present invention, in image coded signals each of which has been generated by dividing an image into one or more blocks and then coding the block, an intra prediction-coded block image is decoded by generating a substitute intra-prediction image or a substitute decoded image even in a mode where pixels in a reference block are to be employed, the reference block where an intra prediction mode specified in coded signals is unavailable according to a standard, due to a coding error, a transmission error, or the like.

NUMERICAL REFERENCES

Figure 1:
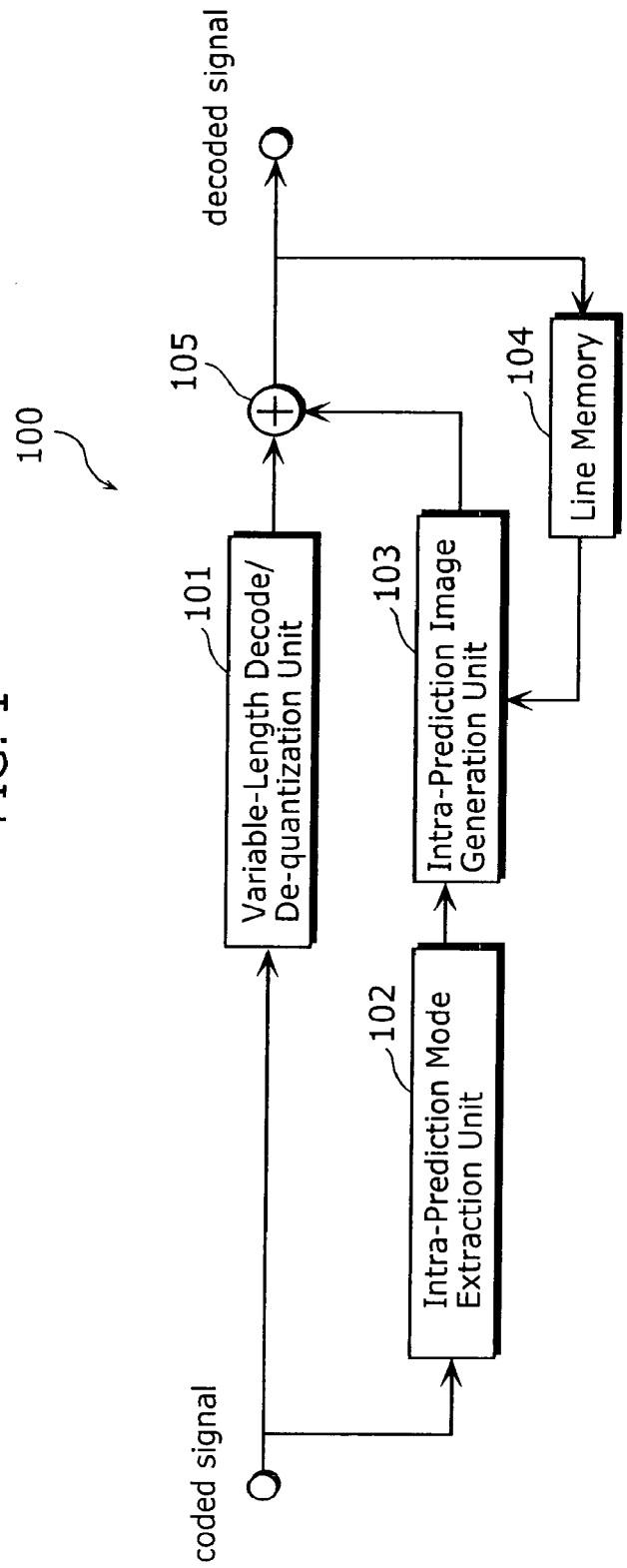
FIG. 1 is a block diagram showing the structure of a conventional image decoding apparatus.

100 Image decoding apparatus
101 Variable-length decode/de-quantization unit
102 Intra-prediction mode extraction unit
103, 103-a Intra-prediction image generation unit
104 Line memory
105 Adder
200 Image decoding apparatus
201 Reference pixel determination unit
202 Switch unit
203 Substitute intra-prediction image generation unit
A01, A02 Switch terminal
300 Image decoding apparatus
301 Intra-prediction mode switch unit
400 Image decoding apparatus
401 Substitute reference pixel memory
500 Image decoding apparatus
501 Substitute intra-prediction image memory
600 Image decoding apparatus
601 Reference pixel compulsory obtainment unit
700 Image decoding apparatus
701 Substitute decoded image generation unit
702 Substitute decoded image memory
800 Image decoding apparatus
801 Substitute switch unit

DETAILED DESCRIPTION OF THE INVENTION

Hereinafter, embodiments of the present invention will be described with reference to the accompanying drawings.

First Embodiment

Figure 4:
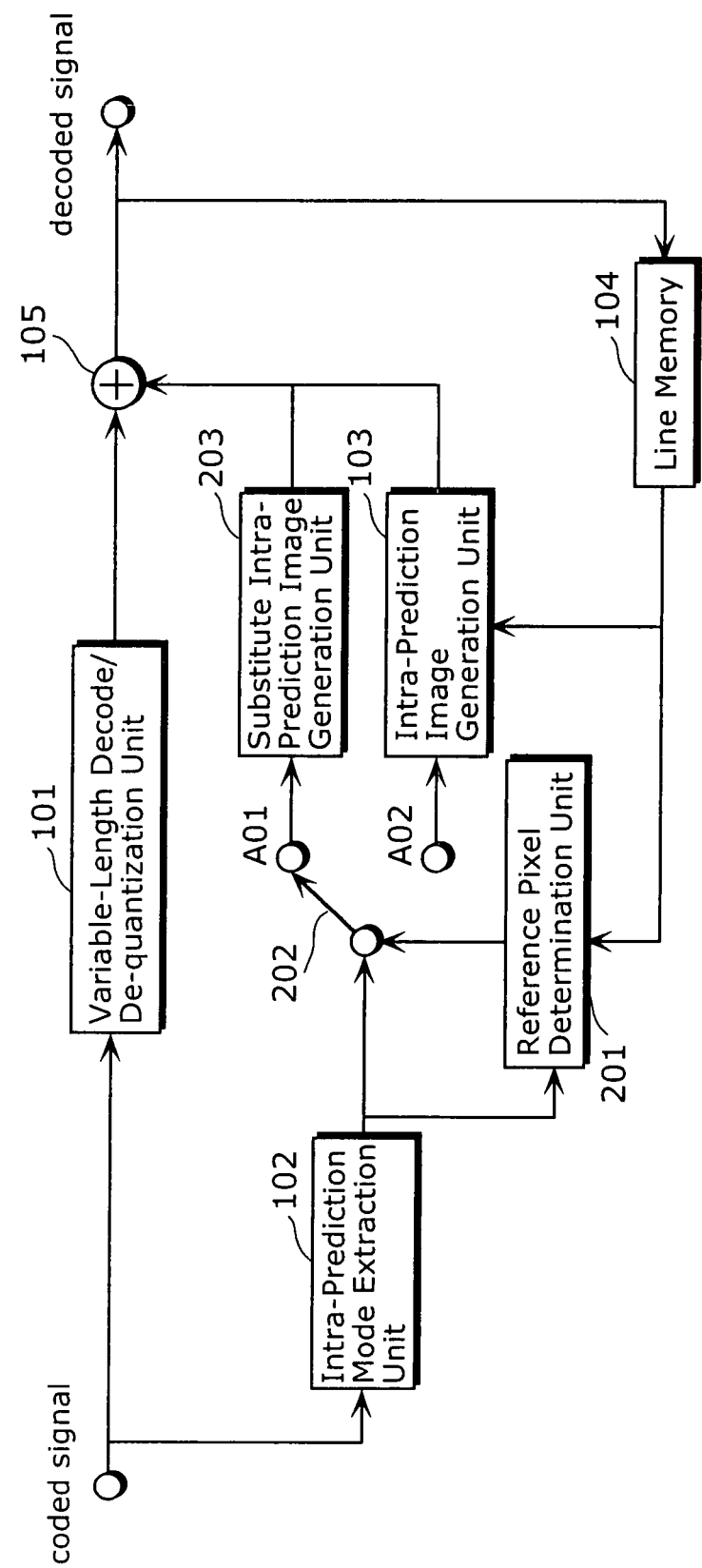
FIG. 4 is a block diagram showing the structure of an image decoding apparatus according to a first embodiment of the present invention.

FIG. 4 is a block diagram showing the structure of an image decoding apparatus 200 according to a first embodiment of the present invention.

The image decoding apparatus 200 shown in FIG. 4, which decodes image coded signals each of which has been generated by dividing an image into one or more blocks and then coding the block, includes a variable-length decode/de-quantization unit 101, an intra-prediction mode extraction unit 102, an intra-prediction image generation unit 103, an adder 105, a line memory 104, a reference pixel determination unit 201, a switch unit 202, and a substitute intra-prediction image generation unit 203. In FIG. 4, the same elements as those shown in FIG. 1 are assigned the same reference numbers, and descriptions thereof are omitted here.

The reference pixel determination unit 201 determines whether or not a reference block necessary for a specified intra prediction mode is available, according to intra-prediction mode information extracted by the intra-prediction mode extraction unit 102, and peripheral block pixel information stored in the line memory 104. The reference pixel determination unit 201 also controls the switch unit 202. When a determination is made that the reference block necessary for the specified intra prediction mode designated by the intra-prediction mode information is available, the reference pixel determination unit 201 connects the switch unit 202 to a switch terminal A02. When a determination is made that one or more reference blocks necessary for the specified intra prediction mode are unavailable, the reference pixel determination unit 201 connects the switch unit 202 to a switch terminal A01.

As the switch unit 202 is connected to the switch terminal A01, the substitute intra-prediction image generation unit 203 operates to generate a substitute intra-prediction image.

The generated substitute intra-prediction image is outputted to the adder 105, added to differential block image data, and then outputted as decoded signals.

In order for the substitute intra-prediction image generation unit 203 to generate a substitute intra-prediction image, the following cases (a) to (d) are conceivable: (a) a case when intra prediction modes are switched; (b) a case when a substitute reference pixel memory is employed; (c) a case when a substitute intra-prediction image memory is employed; and (d) a case when reference pixels are obtained compulsorily. Hereinafter, a detail description is given for each of the cases.

(a) Case when Intra Prediction Modes are Switched

Figure 5:
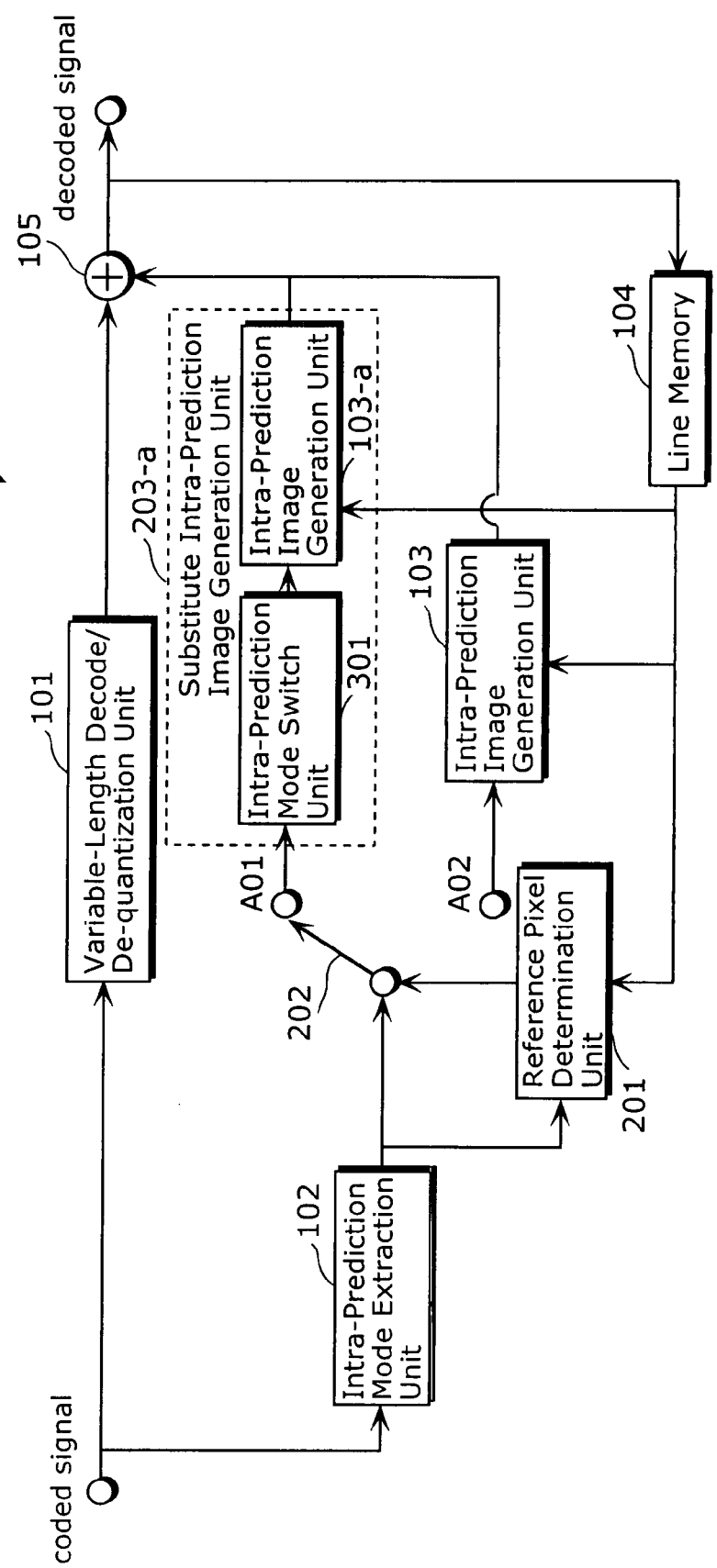
FIG. 5 is a block diagram showing a substitute intra-prediction image generation unit according to the first embodiment of the present invention, in which intra prediction modes are switched.

FIG. 5 is a block diagram showing the configuration of an image decoding apparatus 300 in which a substitute intra-prediction image generation unit 203 switches intra prediction modes ((a)).

A substitute intra-prediction image generation unit 203-a includes an intra-prediction mode switch unit 301 and an intra-prediction image generation unit 103-a.

The intra-prediction mode switch unit 301 switches to an intra prediction mode in which a reference pixel determined to be unavailable by the reference pixel determination unit 201 is not employed. In this case, when the coded signal is a coded signal coded according to the MPEG-4 AVC standard, the intra-prediction mode switch unit 301 selects DC (average value) prediction mode as the intra prediction mode in which a pixel determined to be unavailable is not employed, and switches thereto. As described above, DC (average value) prediction mode is a mode in which only pixels of an available block out of the above- and left-adjacent blocks, are referenced to generate an intra-prediction image.

The intra-prediction image generation unit 103-a employs an intra prediction mode specified by the intra-prediction mode switch unit and the pixel values of reference blocks obtained from the line memory 104 so as to generate a substitute intra-prediction image. The generated substitute intra-prediction image is outputted to the adder 105.

Figure 6:
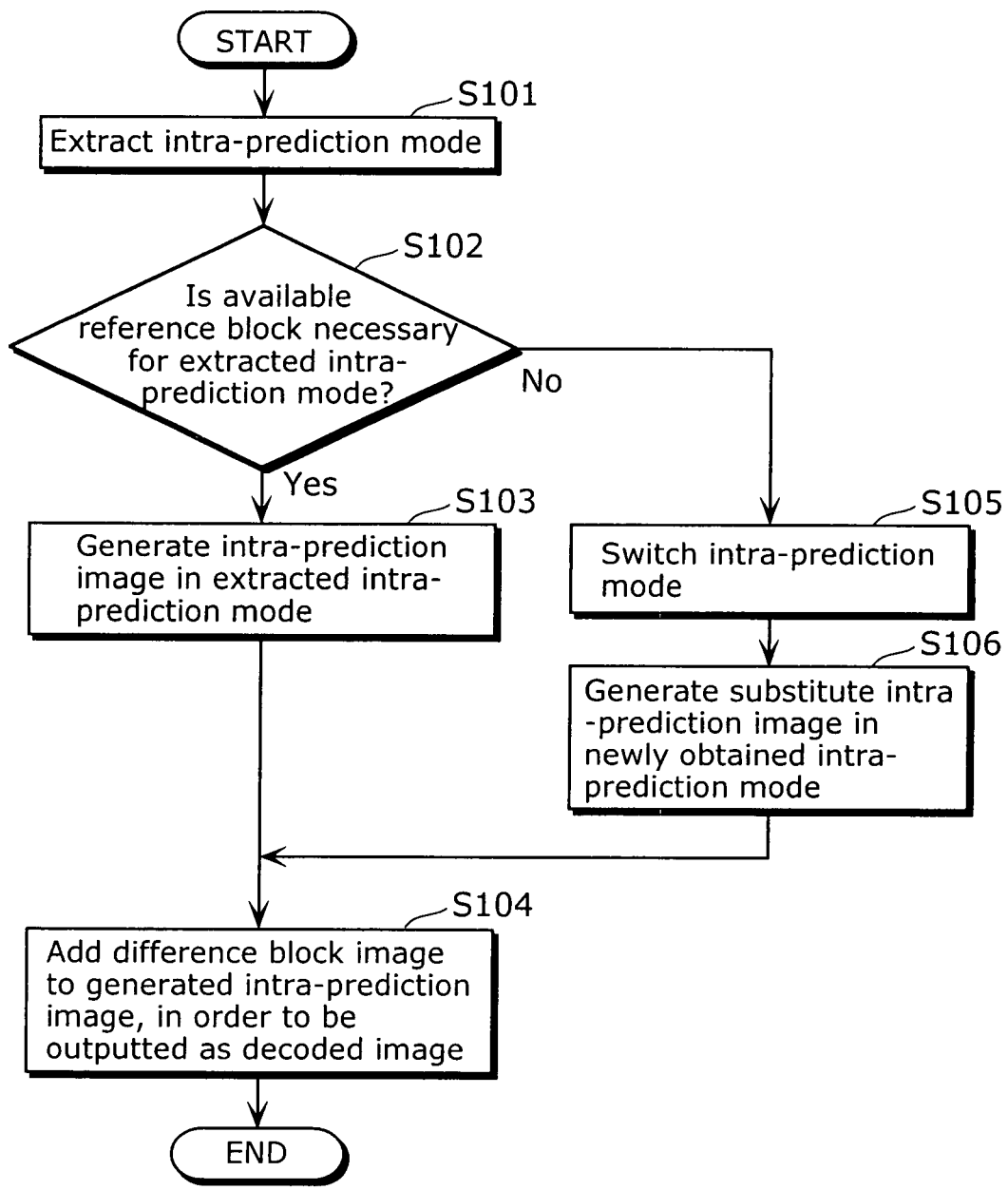
FIG. 6 is a flowchart showing the operation of the substitute intra-prediction image generation unit according to the first embodiment of the present invention, in which intra prediction modes are switched.

Next, a description is given for the operation of the image decoding apparatus 300 having such a configuration. FIG. 6 is a flowchart showing the operation of the image decoding apparatus 300.

The intra-prediction mode extraction unit 102 extracts intra-prediction mode information contained in coded signals block by block (Step S 101). Next, the reference pixel determination unit 201 determines whether or not a reference block necessary for an intra prediction mode specified in intra-prediction mode information, is available, based on the intra-prediction mode information extracted by the intra-prediction mode extraction unit 102 and peripheral block pixel information stored in the line memory 104 (Step S 102). When the reference block necessary for the intra prediction mode specified in the intra-prediction mode information is available (Yes in Step S 102), the reference pixel determination unit 201 connects the switch unit 202 to the switch terminal A02 to operate the intra-prediction image generation unit 103. The intra-prediction image generation unit 103 then obtains the reference pixels of the necessary reference block from the line memory 104 according to the intra prediction mode specified in the intra-prediction mode information; generates an intra-prediction image block by block; outputs the generated intra-prediction image to the adder 105 (Step S 103). Next, the adder 105 adds the intra-prediction image outputted from the intra-prediction image generation unit 103, to differential block image data transformed from coded signals by the variable-length decode/de-quantization unit 101, so as to generate a decoded image (Step S 104). In this step, the decoded image, as the addition result, is outputted from an output terminal as decoded signals, as well as is stored in the line memory 104 as a reference block image for next intra-prediction image generation.

On the other hand, when the reference block necessary for the intra prediction mode specified in the intra-prediction mode information is unavailable (No in Step S 102), the reference pixel determination unit 201 connects the switch unit 202 to the switch terminal A01 to operate the substitute intra-prediction image generation unit 203-a. The intra-prediction mode switch unit 301 switches to the intra prediction mode in which reference pixels are not employed (Step S 105). The intra-prediction image generation unit 103-a then generates a substitute intra-prediction image by employing the intra prediction mode to which the intra-prediction mode switch unit 301 has switched as well as the pixel values of the reference block obtained from the line memory 104, so as to output the generated substitute intra-prediction image to the adder 105 (Step S 106). Next, the adder 105 adds the substitute intra-prediction image outputted from the intra-prediction image generation unit 103-a, to differential block image data transformed from coded signals by the variable-length decode/de-quantization unit 101, so as to generate a decoded image (Step S 104).

In FIG. 5, the intra-prediction image generation unit 103 and the intra-prediction image generation unit 103-a may be the same unit.

In the above case, the intra-prediction mode switch unit 301 selects DC (average value) prediction mode and switches thereto as the intra prediction mode in which a pixel determined to be unavailable is not employed. However, this embodiment is not limited to the case. Examples of selection methods other than DC (average value) prediction mode include the following methods: a method of switching to an intra prediction mode employing reference pixels of a block other than the above adjacent block when the reference pixels of the above-adjacent block are unavailable; and a method of switching to an intra prediction mode employing reference pixels of a block other than the left-adjacent block when the reference pixels of the left-adjacent block are unavailable. In the case where a plurality of substitutable intra prediction modes are available, for example, the intra prediction mode last specified before a current block or the intra prediction mode specified most frequently before a current block may be employed.

Figure 2:
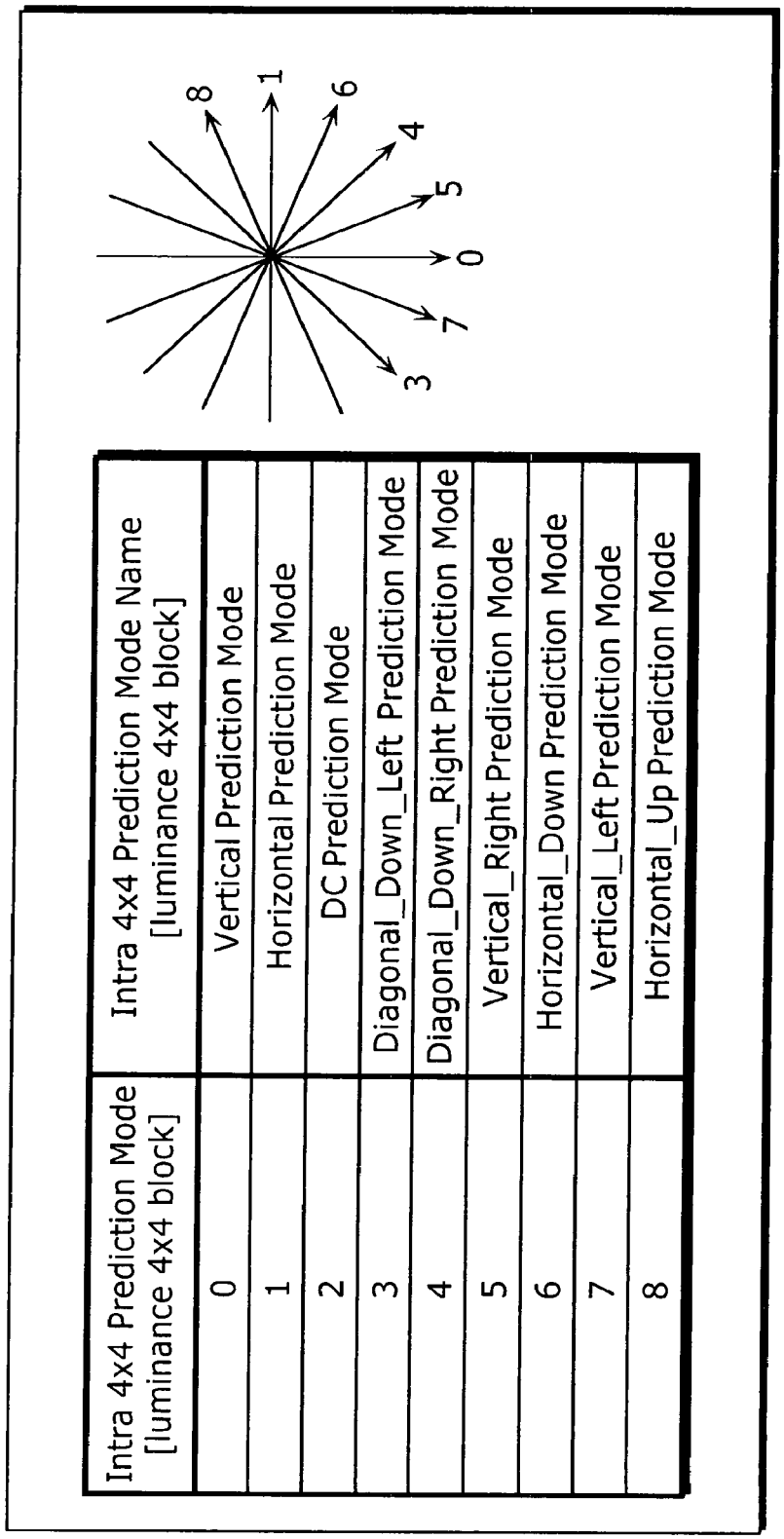
FIG. 2 lists intra prediction modes available in MPEG-4 AVC standards.
Figure 3:
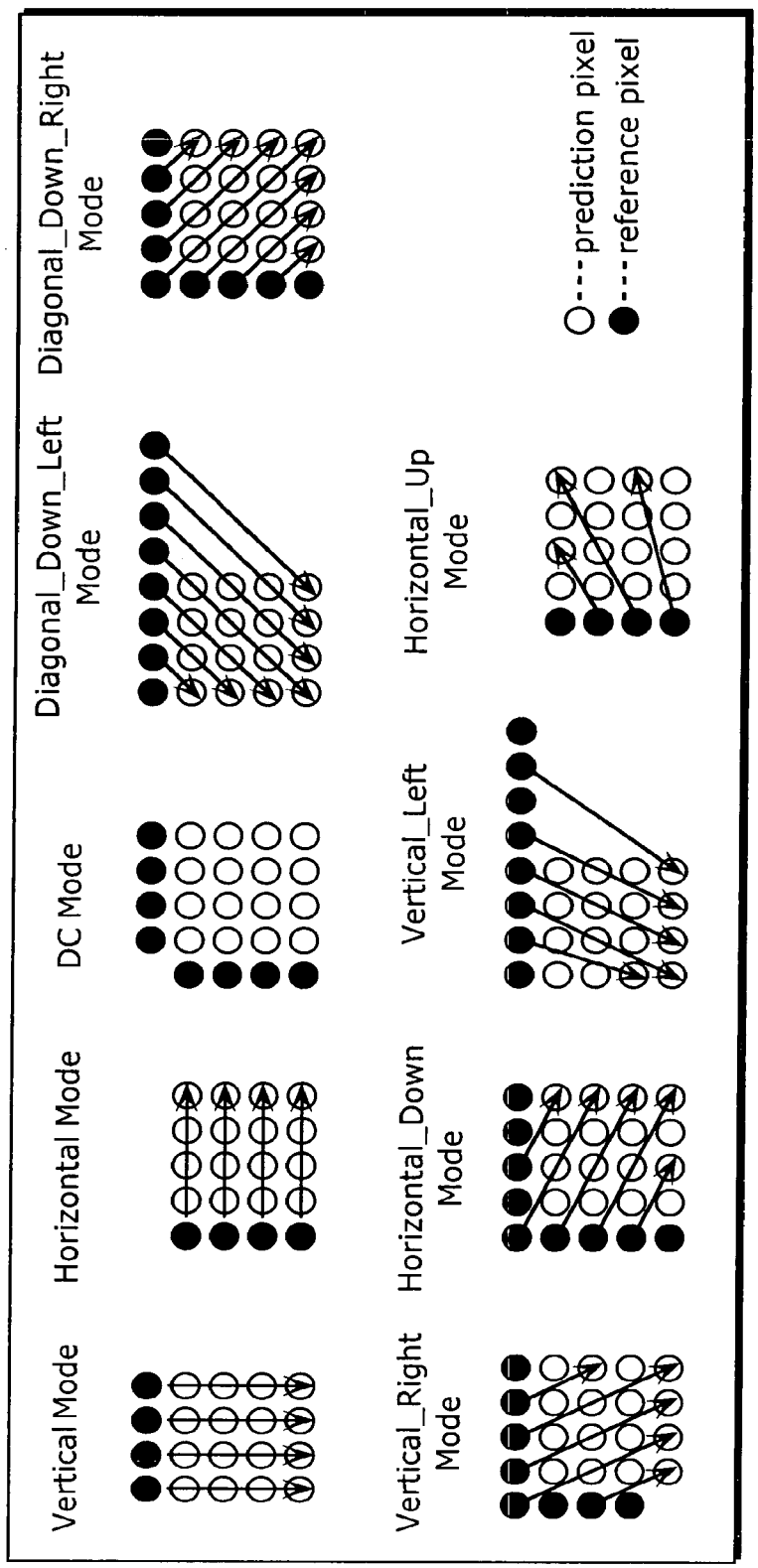
FIG. 3 shows prediction directions and reference pixels for Intra 4×4 prediction modes according to MPEG-4 AVC standards.

Furthermore, intra prediction modes to be substituted may be predetermined for each pattern unavailable for reference. The intra prediction mode having the minimum or maximum one of the numbers allocated to the intra prediction modes shown in FIG. 2, may also be employed.

Even in the case where the intra-prediction mode extraction unit 102 is unable to extract intra-prediction mode information due to a coded signal error, a coding-method error, or the like, the switch unit 202 may connect to the switch terminal A01 so as to generate an intra prediction mode in which the intra-prediction mode switch unit 301 is available. Any one of the options proposed above is not limited to this embodiment.

(b) Case when Substitute Reference Pixel Memory is Employed

Figure 7:
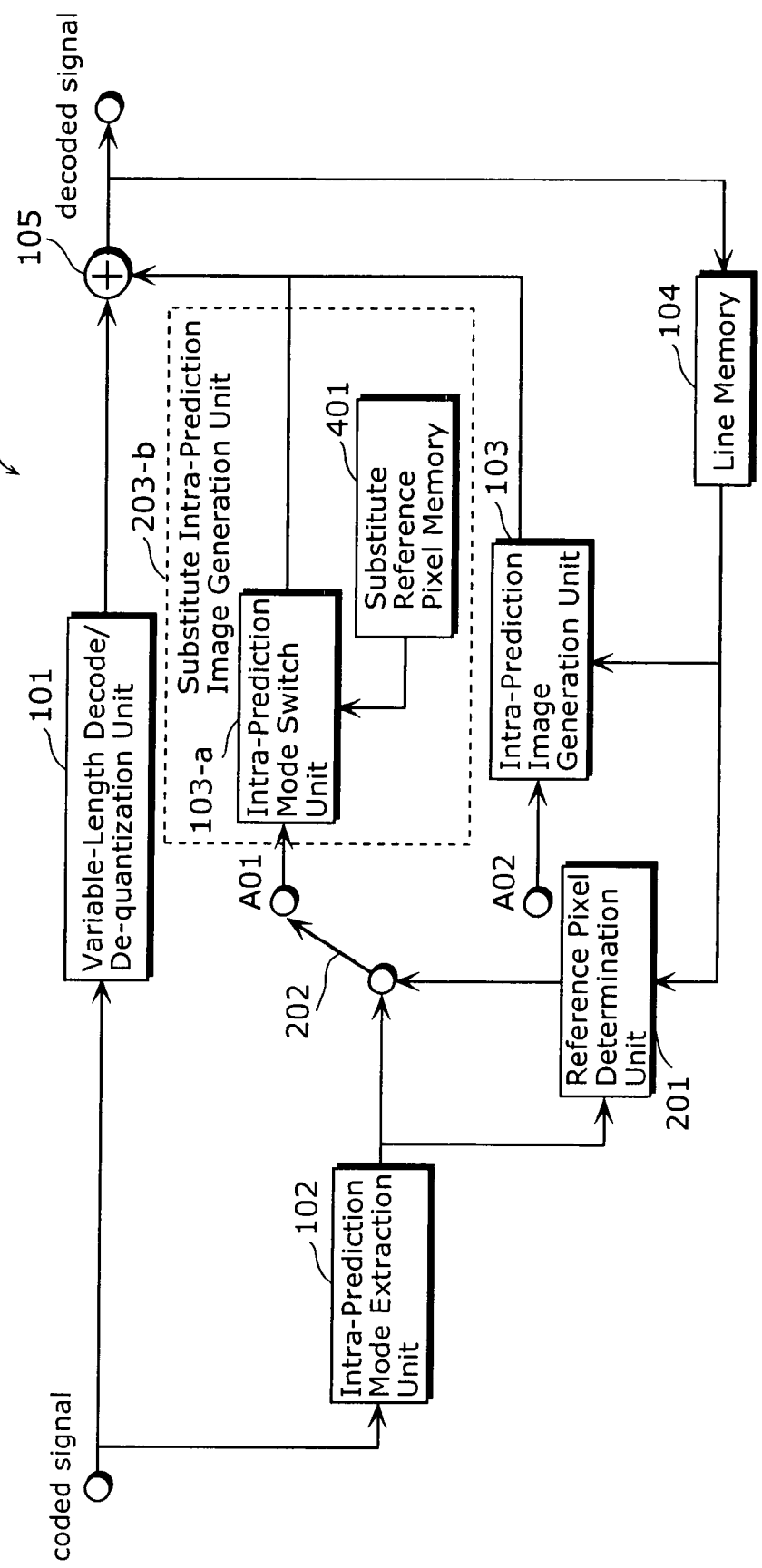
FIG. 7 is a block diagram showing the substitute intra-prediction image generation unit according to the first embodiment of the present invention, in which a substitute reference pixel memory is employed.

FIG. 7 is a block diagram showing the configuration of an image decoding apparatus 400 in which the substitute intra-prediction image generation unit 203 employs a substitute reference pixel memory ((b)). In FIG. 7, the same elements as those shown in FIG. 4 are assigned the same reference numbers, and descriptions thereof are omitted here.

A substitute Intra-prediction image generation unit 203-b includes a substitute reference pixel memory 401 and an intra-prediction image generation unit 103-a. The substitute reference pixel memory 401 which stores fixed pixel values, outputs the pixel values to the intra-prediction image generation unit 103-a for reference, instead of reference pixels determined to be unavailable. The intra-prediction image generation unit 103-a employs an intra prediction mode specified in intra-prediction mode information and the values of reference pixels obtained from the substitute reference pixel memory 401, so as to generate a substitute intra-prediction image.

Figure 8:
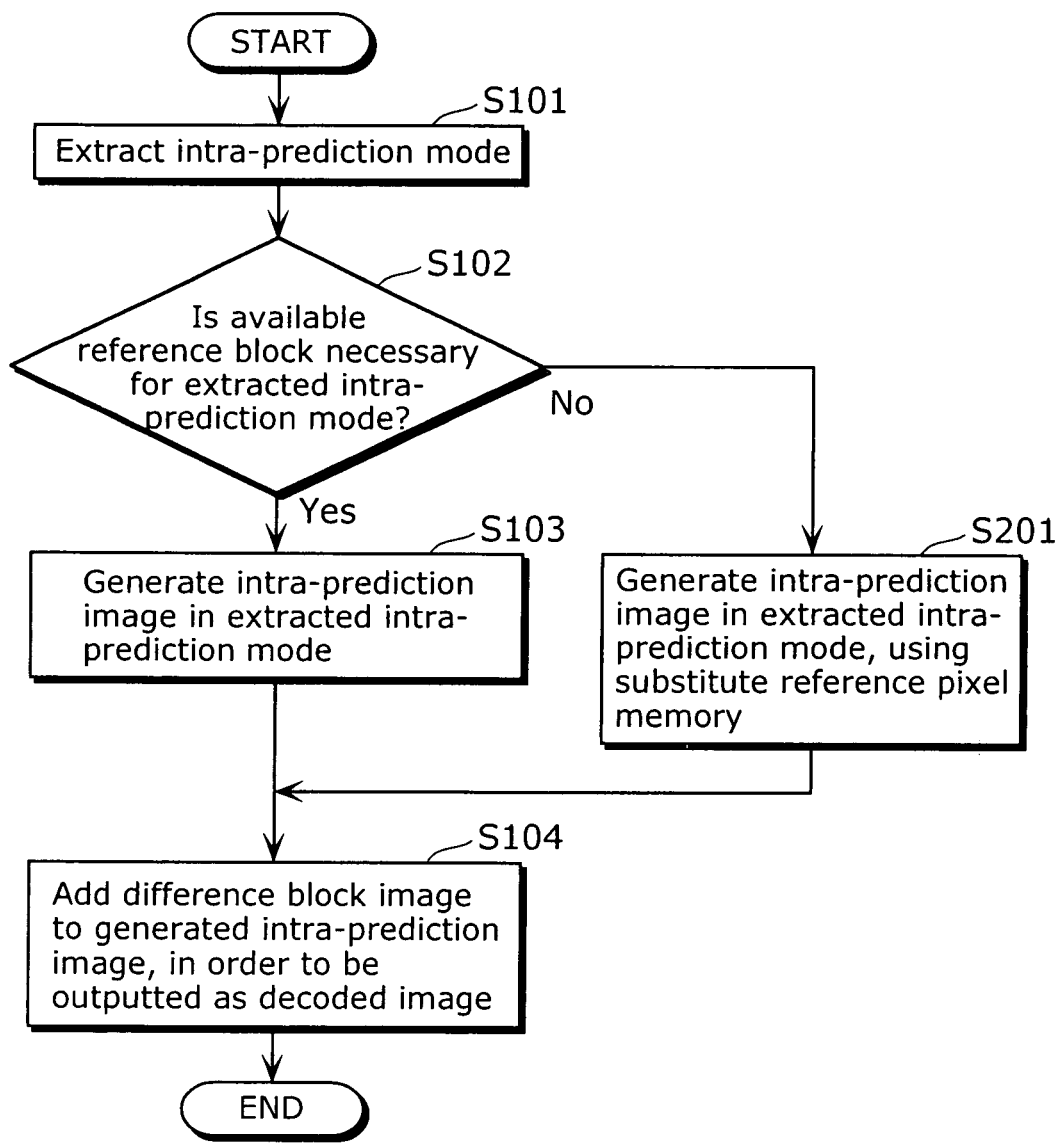
FIG. 8 is a flowchart showing the operation of the substitute intra-prediction image generation unit according to the first embodiment of the present invention, in which a substitute reference pixel memory is employed.

Next, a description is given for the operation of the image decoding apparatus 400 having such a configuration. FIG. 8 is a flowchart showing the operation of the image decoding apparatus 400. In FIG. 8, the same operations as those shown in FIG. 6 are assigned the same reference numbers, and descriptions thereof are omitted here.

The operation from the intra-prediction mode information extracting process (Step S 101) through the decoded image generating process (Step S 104) to be performed when a reference block necessary for an intra prediction mode specified in intra-prediction mode information is available, the same as the operation shown in FIG. 6.

On the other hand, when a reference block necessary for an intra prediction mode specified in intra-prediction mode information is unavailable (No in Step S 102), the reference pixel determination unit 201 connects the switch unit 202 to the switch terminal A01 to operate the substitute intra-prediction image generation unit 203-*b*. The intra-prediction image generation unit 103-*a* employs the intra prediction mode specified in the intra-prediction mode information as well as the values of the reference pixels obtained from the substitute reference pixel memory 401, generates a substitute intra-prediction image, and outputs the generated substitute intra-prediction image to the adder 105 (Step S 201). Next, the adder 105 adds the substitute intra-prediction image outputted from the intra-prediction image generation unit 103-*a*, to differential block image data transformed from coded signals by the variable-length decode/de-quantization unit 101, so as to generate a decoded image (Step S 104).

Figure 9:
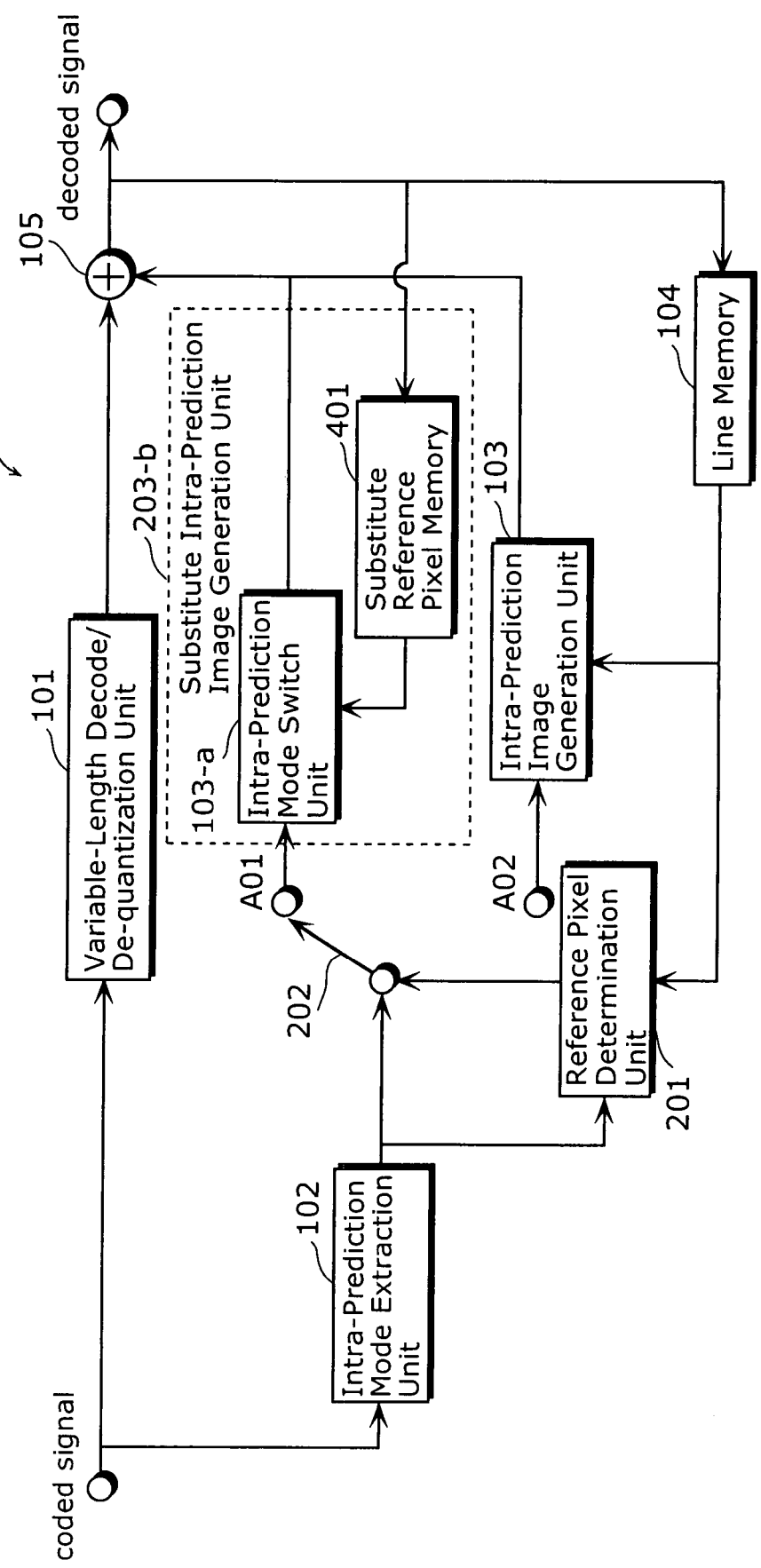
FIG. 9 is a block diagram showing a case in which the substitute reference pixel memory stores another decoded block image.

Regarding pixel values to be stored in the substitute reference pixel memory 401 for substitute reference, as shown in FIG. 9, the output destination of the adder 105 may be connected to the substitute reference pixel memory 401 such that the pixel values of another decoded picture or the pixel values of another decoded block within the same picture are stored therein. This embodiment is limited to neither of these examples.

In FIG. 7 and FIG. 9, the intra-prediction image generation unit 103 and the intra-prediction image generation unit 103-*a* may be the same unit.

(c) Case when Substitute Intra-Prediction Image Memory is Employed

Figure 10:
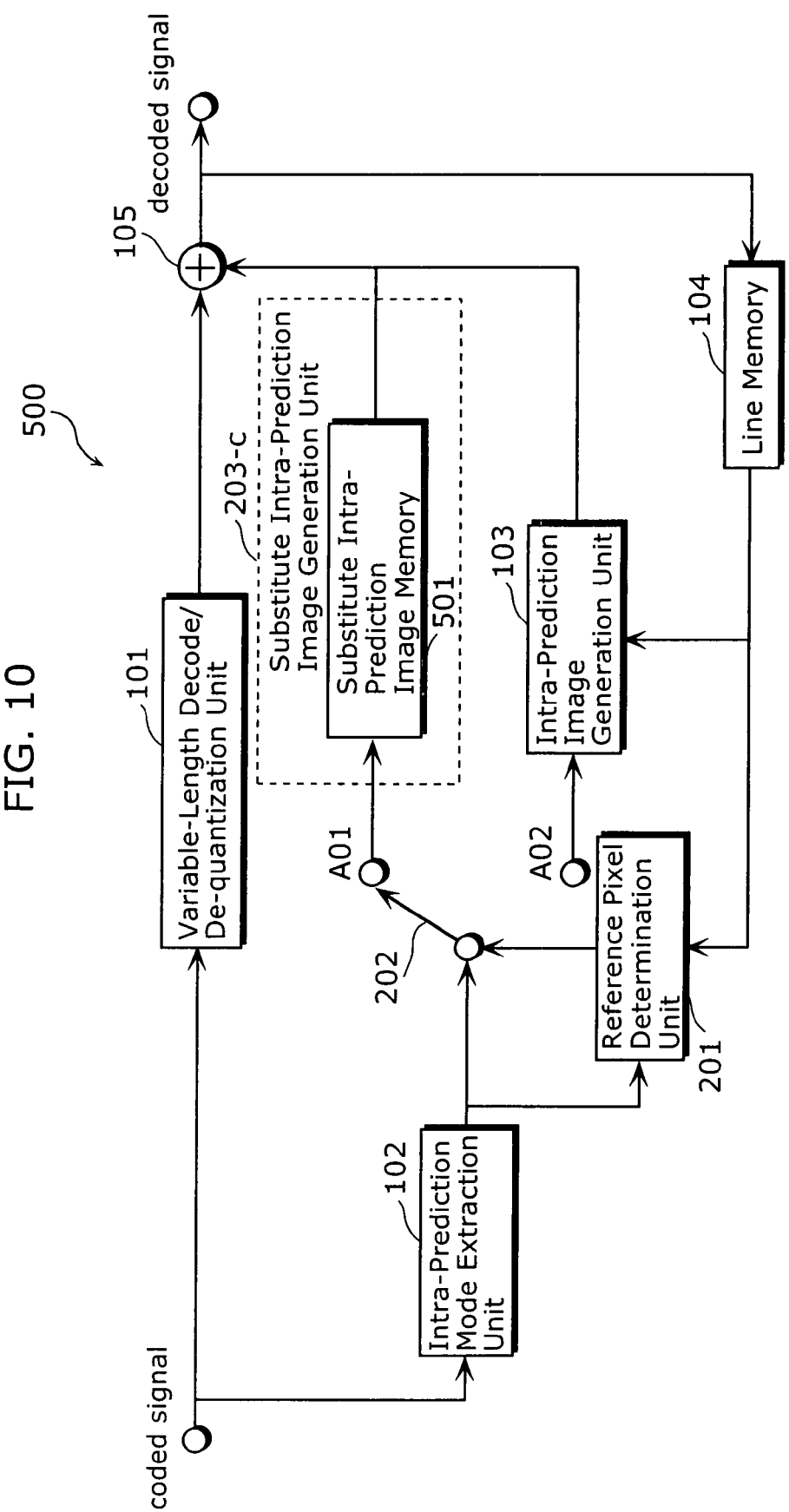
FIG. 10 is a block diagram showing a case in which the substitute intra-prediction image generation unit according to the first embodiment of the present invention employs a substitute intra-prediction image memory.

FIG. 10 is a block diagram showing the configuration of an image decoding apparatus 500 in which a substitute intra-prediction image generation unit 203 employs a substitute intra-prediction image memory ((c)).

A substitute Intra-prediction image generation unit 203-*c* includes a substitute intra-prediction image memory 501. The substitute intra-prediction image memory 501, which stores fixed pixel values, outputs the pixel values to the adder 105 as a substitute intra-prediction image.

Figure 11:
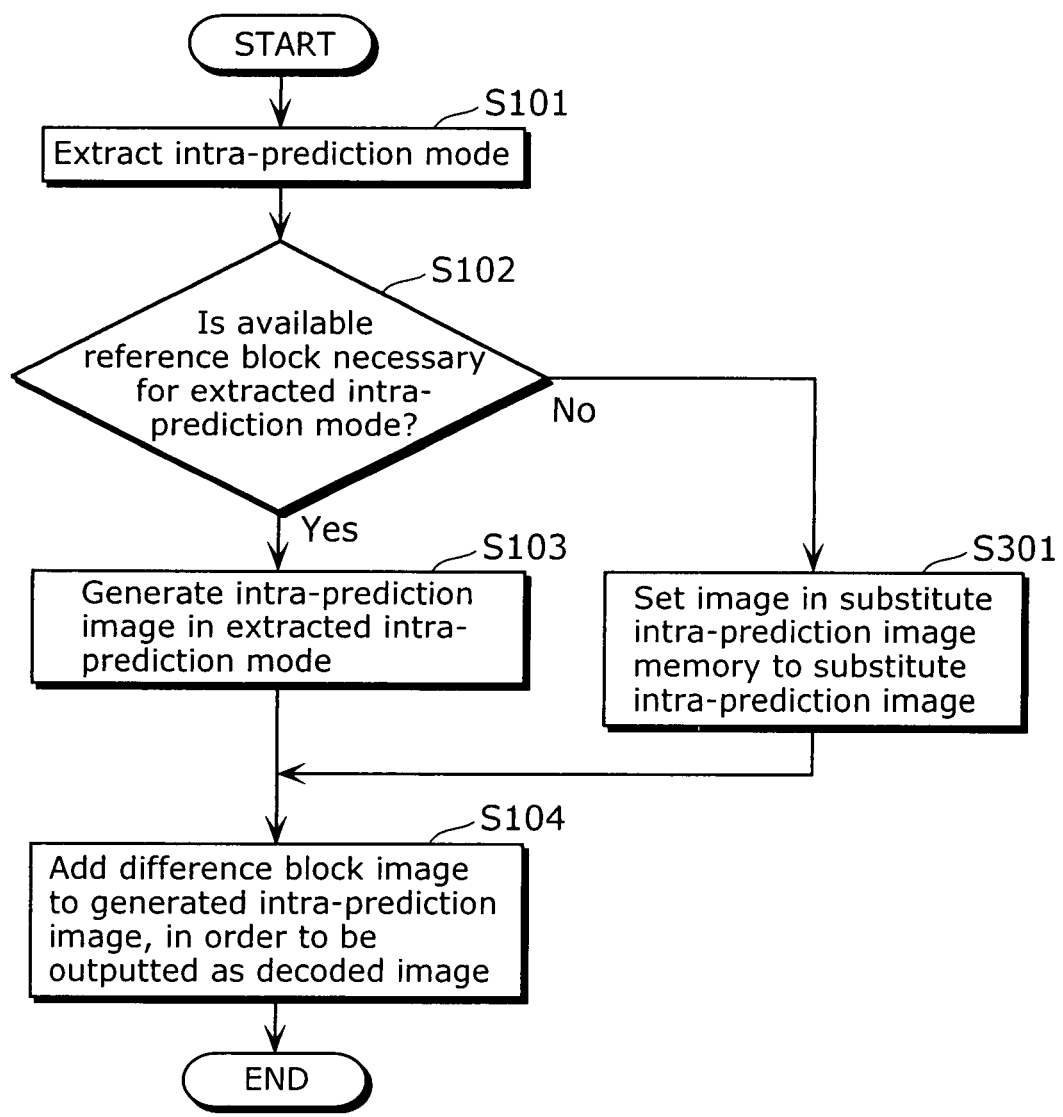
FIG. 11 is a flowchart showing the operation of the substitute intra-prediction image generation unit according to the first embodiment of the present invention, in which the substitute intra-prediction image memory is employed.

Next, a description is given for the operation of the image decoding apparatus 500 thus configured. FIG. 11 is a flowchart showing the operation of the image decoding apparatus 500. In FIG. 11, the same operations as those shown in FIG. 6 are assigned the same reference numbers, and descriptions thereof are omitted here.

The operation from the intra-prediction mode information extracting process (Step S 101) through the decoded image generating process (Step S 104) to be performed when a reference block necessary for an intra prediction mode specified in intra-prediction mode information is available, the same as the operation shown in FIG. 6.

On the other hand, when a reference block necessary for an intra prediction mode specified in intra-prediction mode information is unavailable (No in Step S 102), the reference pixel determination unit 201 connects the switch unit 202 to the switch terminal A01 to operate the substitute Intra-prediction image generation unit 203-*c*. The substitute intra-prediction image memory 501 outputs the pixel values stored therein, to the adder 105 as a substitute intra-prediction image (Step S 301). Next, the adder 105 adds the substitute intra-prediction image outputted from the substitute intra-prediction image memory 501, to differential block image data transformed from coded signals by the variable-length decode/de-quantization unit 101 so as to generate a decoded image (Step S 104).

Figure 12:
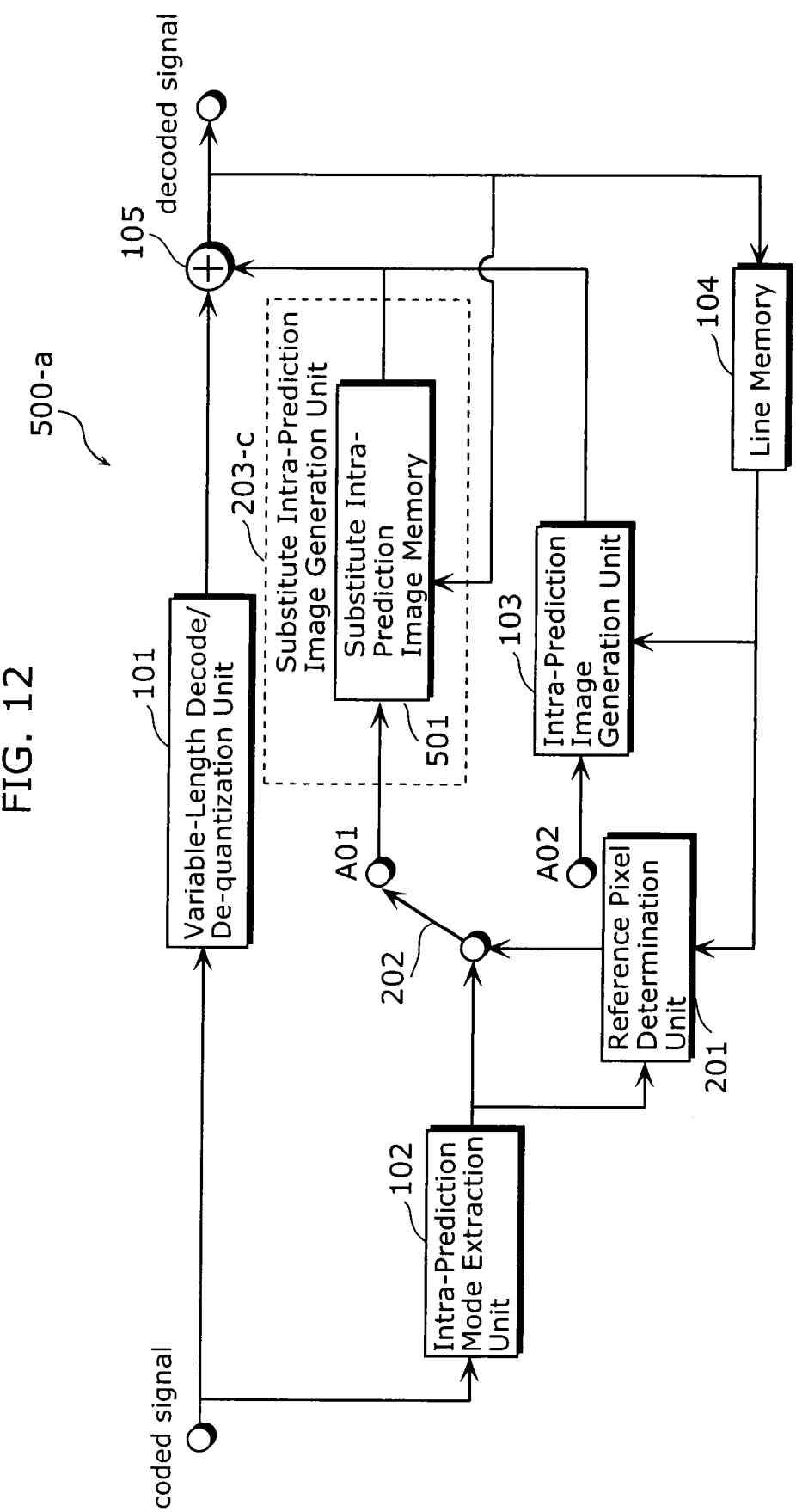
FIG. 12 is a block diagram showing the substitute intra-prediction image memory, in which another decoded block image is stored.

Regarding pixel values to be stored in the substitute intra-prediction image memory 501, as shown in FIG. 12, the output destination of the adder 105 may be connected to the substitute intra-prediction image memory 501 such that the pixel values of another decoded picture or the pixel values of another decoded block within the same picture are stored therein. This embodiment is limited to neither of these examples.

(d) Case when Reference Pixels are Obtained Compulsorily

Figure 13:
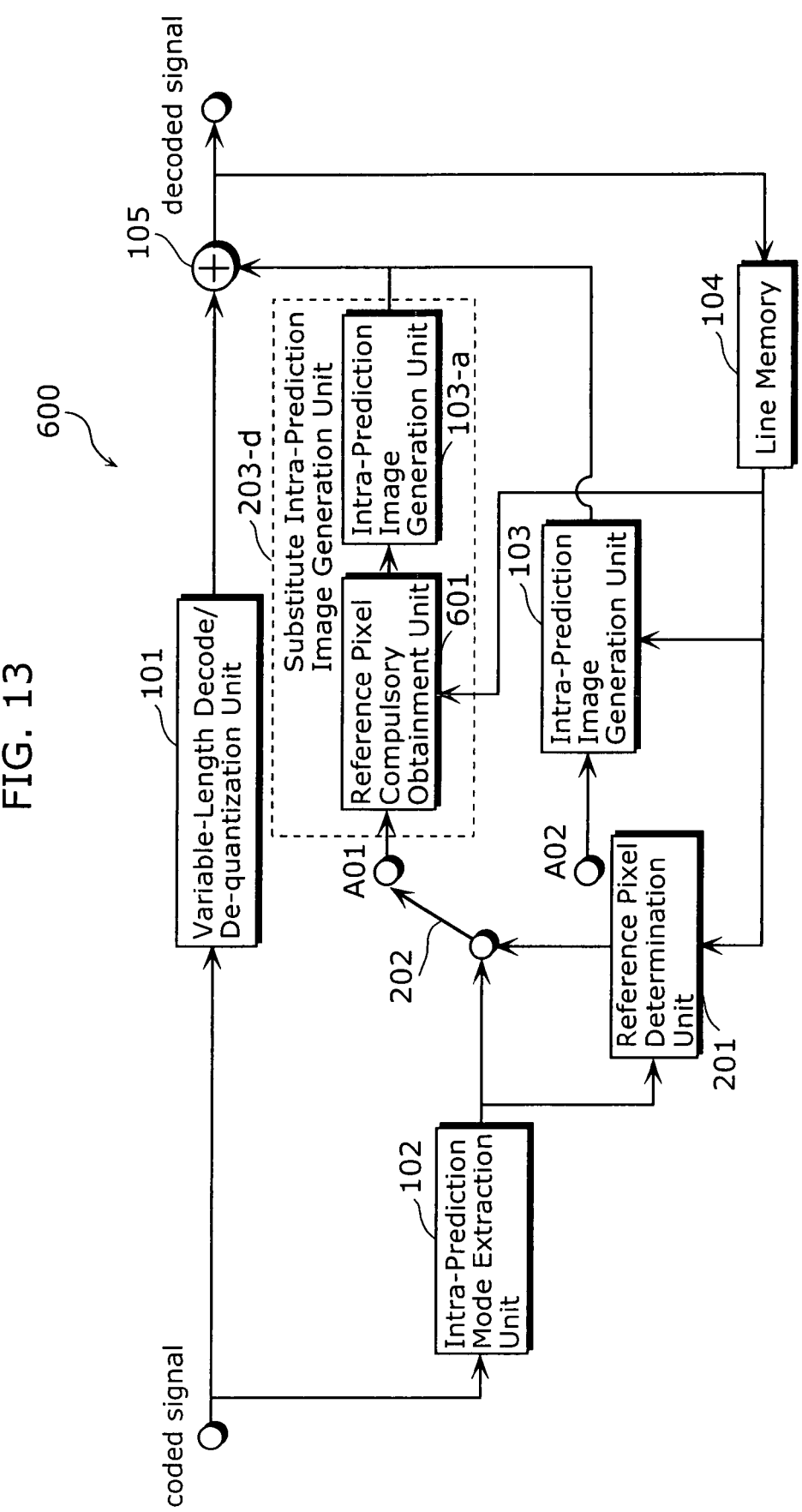
FIG. 13 is a block diagram showing the substitute intra-prediction image generation unit according to the first embodiment of the present invention, in which reference pixels are obtained compulsorily.

FIG. 13 is a block diagram showing the configuration of an image decoding apparatus 600 in which a substitute intra-prediction image generation unit 203 obtains reference pixels compulsorily ((d)).

A substitute Intra-prediction image generation unit 203-*d* includes a reference pixel compulsory obtainment unit 601 and an intra-prediction image generation unit 103-*a*. The reference pixel compulsory obtainment unit 601 obtains pixel information from a memory as a reference pixel even in the case where the information belongs to a pixel of the block unavailable for reference according to a standard.

For example, the MPEG-4 AVC standards defines the following three types of blocks unavailable: (a) a block not positioned on a picture; (b) a block belonging to a slice different from the slice to which a block to be decoded belongs; and (c) a block inter-picture predicted in the case where an intra prediction-restriction flag in coded signals restricts the reference to an inter-coded block.

Even in the case where a pixel belongs to a block fitting the definitions (b) and (c), the reference pixel compulsory obtainment unit 601 obtains the pixel from the line memory 104 compulsorily to output the pixel to the intra-prediction image generation unit 103-*a* as a reference pixel. This allows a pixel to be employed as a reference pixel, thereby generating an intra-prediction image, even in the case where the pixel is defined to be unavailable according to a standard.

Figure 14:
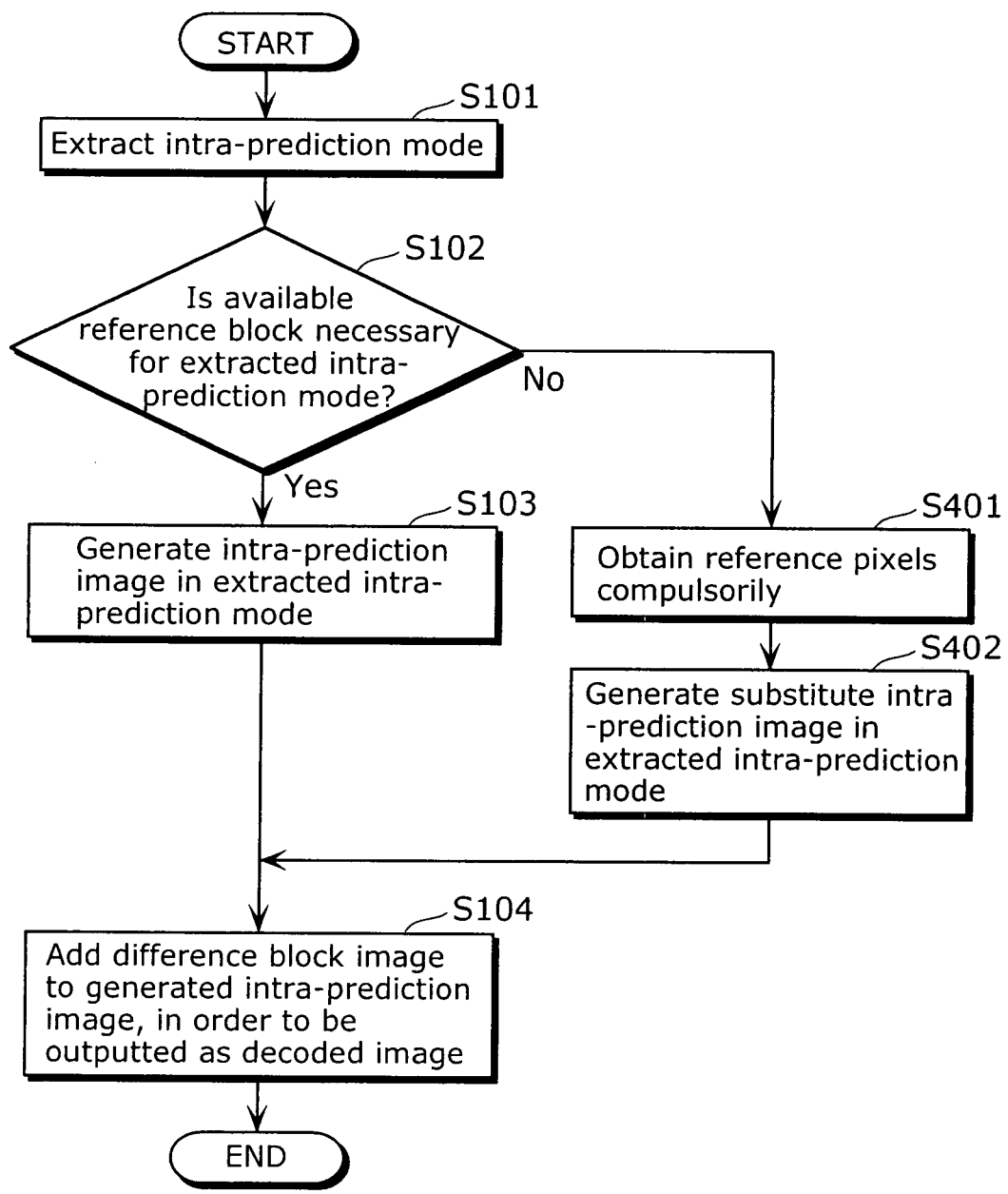
FIG. 14 is a flowchart showing the operation of the substitute intra-prediction image generation unit according to the first embodiment of the present invention, in which reference pixels are obtained compulsorily.

Next, a description is given for the operation of the image decoding apparatus 600 thus configured. FIG. 14 is a flowchart showing the operation of the image decoding apparatus 600. In FIG. 14, the same elements as those shown in FIG. 6 are assigned the same reference numbers, and descriptions thereof are omitted here.

The operation from the intra-prediction mode information extracting process (Step S 101) through the decoded image generating process (Step S 104) to be performed when a reference block necessary for an intra prediction mode specified in intra-prediction mode information is available, the same as the operation shown in FIG. 6.

On the other hand, when a reference block necessary for an intra prediction mode specified in intra-prediction mode information is unavailable (No in Step S 102), the reference pixel determination unit 201 connects the switch unit 202 to the switch terminal A01 to operate the substitute Intra-prediction image generation unit 203-*d*. The reference pixel compulsory obtainment unit 601, even in the case where a pixel belongs to a block fitting the definitions (b) and (c), obtains the pixel from the line memory 104 compulsorily, and outputs the pixel to the intra-prediction image generation unit 103-*a* as a reference pixel (Step S 401). The intra-prediction image generation unit 103-*a* then employs the intra prediction mode specified in the intra-prediction mode information as well as the values of the reference pixels obtained by the reference pixel compulsory obtainment unit 601 to generate a substitute intra-prediction image, and then outputs the generated substitute intra-prediction image to the adder 105 (Step S 402). Next, the adder 105 adds the substitute intra-prediction image outputted from the intra-prediction image generation unit 103-*a*, to differential block image data transformed from coded signals by the variable-length decode/de-quantization unit 101, so as to generate a decoded image (Step S 104).

The memory in which pixels to be obtained by the reference pixel compulsory obtainment unit 601, is stored, is not limited to a line memory. The standard to be adhered to is not limited to MPEG-4 AVC.

In FIG. 13, the intra-prediction image generation unit 103 and the intra-prediction image generation unit 103-*a* may be the same unit.

Furthermore, even in the case where a pixel belongs to a block fitting the definitions (a) and (b), the same effect is achieved as the effect obtained when the substitute intra-prediction image generation unit 203-*d* is employed, even in the following normal method. The switch unit 202 is connected to the switch terminal A02, and the intra-prediction image generation unit 103 obtains reference pixels from the line memory 104 to generate an intra-prediction image.

This allows the substitute intra-prediction image generation unit 203 having one of the configurations (a) to (d) to generate an intra-prediction image and to continue a decoding process even in the case where a pixel in a block is necessary as a reference pixel, the block where an intra prediction mode specified in image coded signals is unavailable, due to a coding error, a transmission error, or the like.

Second Embodiment

Figure 15:
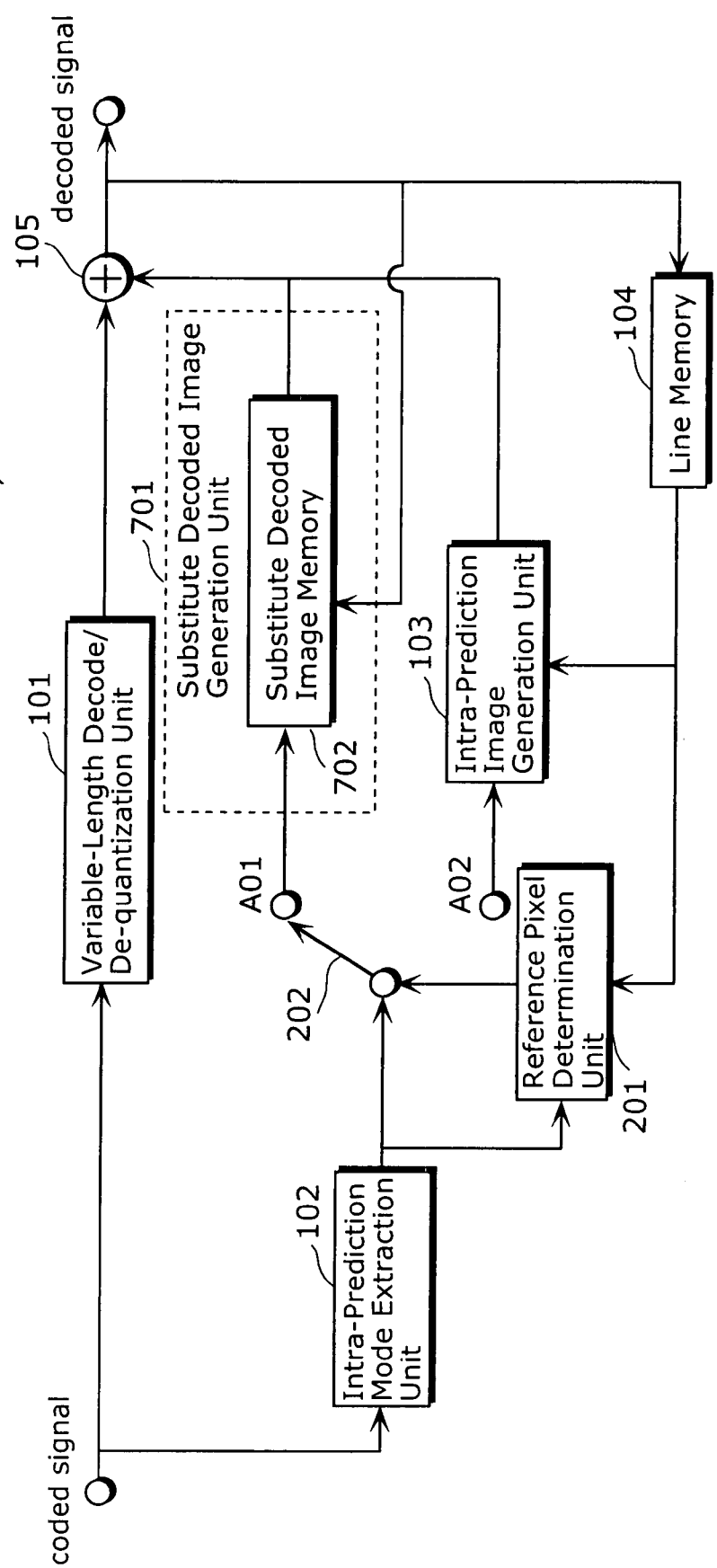
FIG. 15 is a block diagram showing the structure of an image decoding apparatus according to a second embodiment of the present invention.

FIG. 15 is a block diagram showing the structure of an image decoding apparatus 700 according to a second embodiment of the present invention. In FIG. 15, the same elements as those shown in FIG. 4 to FIG. 13 are assigned the same reference numbers, and descriptions thereof are omitted here.

In this embodiment, as shown in FIG. 15, an image decoding apparatus 700 includes a substitute decoded image generation unit 701 on the side of a switch terminal A01, and a substitute decoded image memory 702 inside the substitute decoded image generation unit 701.

The substitute decoded image memory 702 stores a block image whose pixel values are predetermined. When a reference pixel determination unit 201 connects a switch unit 202 to the switch terminal A01, the substitute decoded image generation unit 701 operates to output the block image stored in the inside substitute decoded image memory 702, from the image decoding apparatus 700 as a decoded image. At the same time, the generated substitute decoded image is stored in the line memory 104 as a reference image for the next block.

Figure 16:
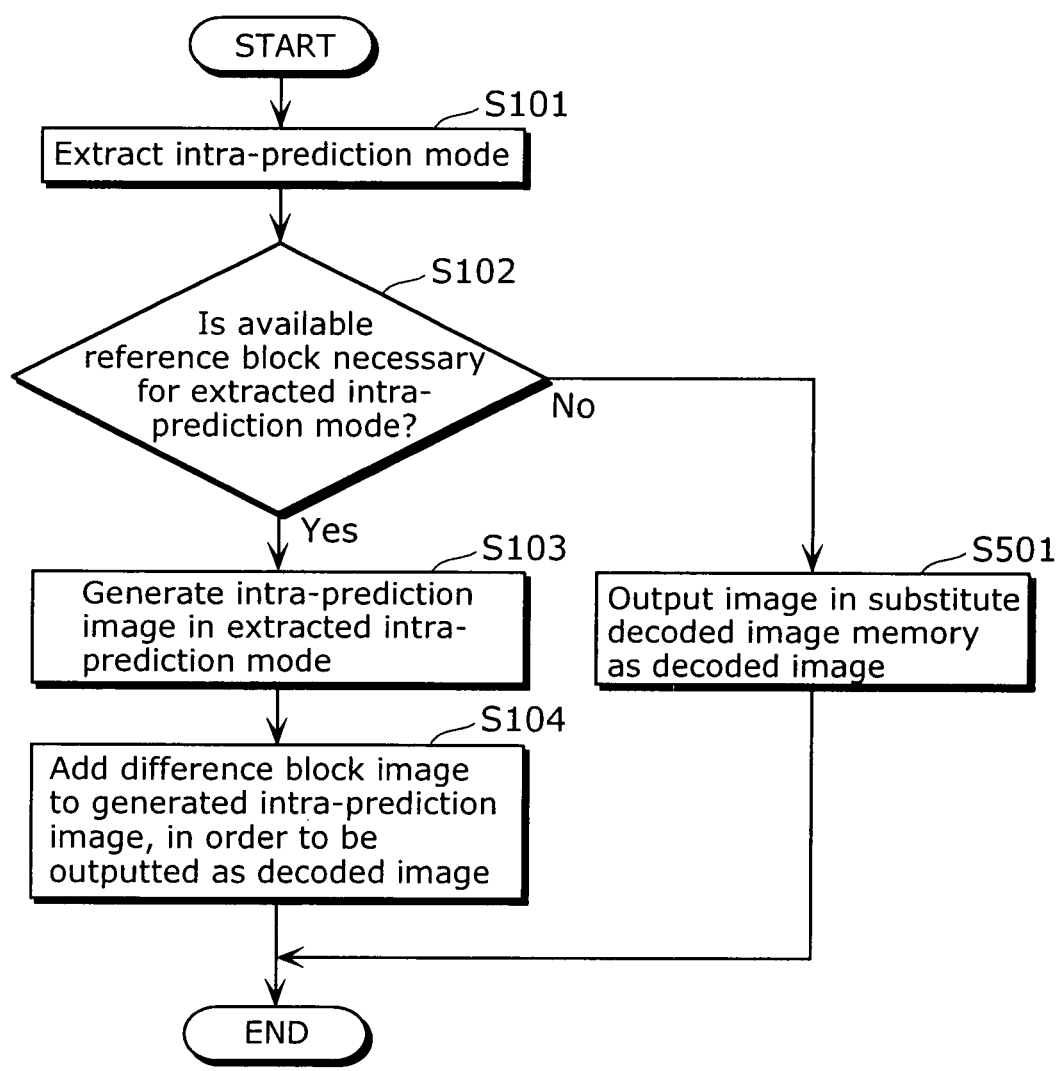
FIG. 16 is a flowchart showing the operation of the image decoding apparatus according to the second embodiment of the present invention.

Next, a description is given for the operation of the image decoding apparatus 700 thus configured. FIG. 16 is a flowchart showing the operation of the image decoding apparatus 700. In FIG. 16, the same operations as those shown in FIG. 6 are assigned the same reference numbers, and descriptions thereof are omitted here.

The operation from the intra-prediction mode information extracting process (Step S 101) through the decoded image generating process (Step S 104) to be performed when a reference block necessary for an intra-prediction mode specified in the intra-prediction mode information is available, the same as the operation shown in FIG. 6.

On the other hand, when a reference block necessary for an intra prediction mode specified in intra-prediction mode information is unavailable (No in Step S 102), the reference pixel determination unit 201 connects the switch unit 202 to the switch terminal A01 to operate the substitute decoded image generation unit 701. The substitute decoded image memory 702 then outputs the stored block image as a decoded image (Step S 501).

Figure 17:
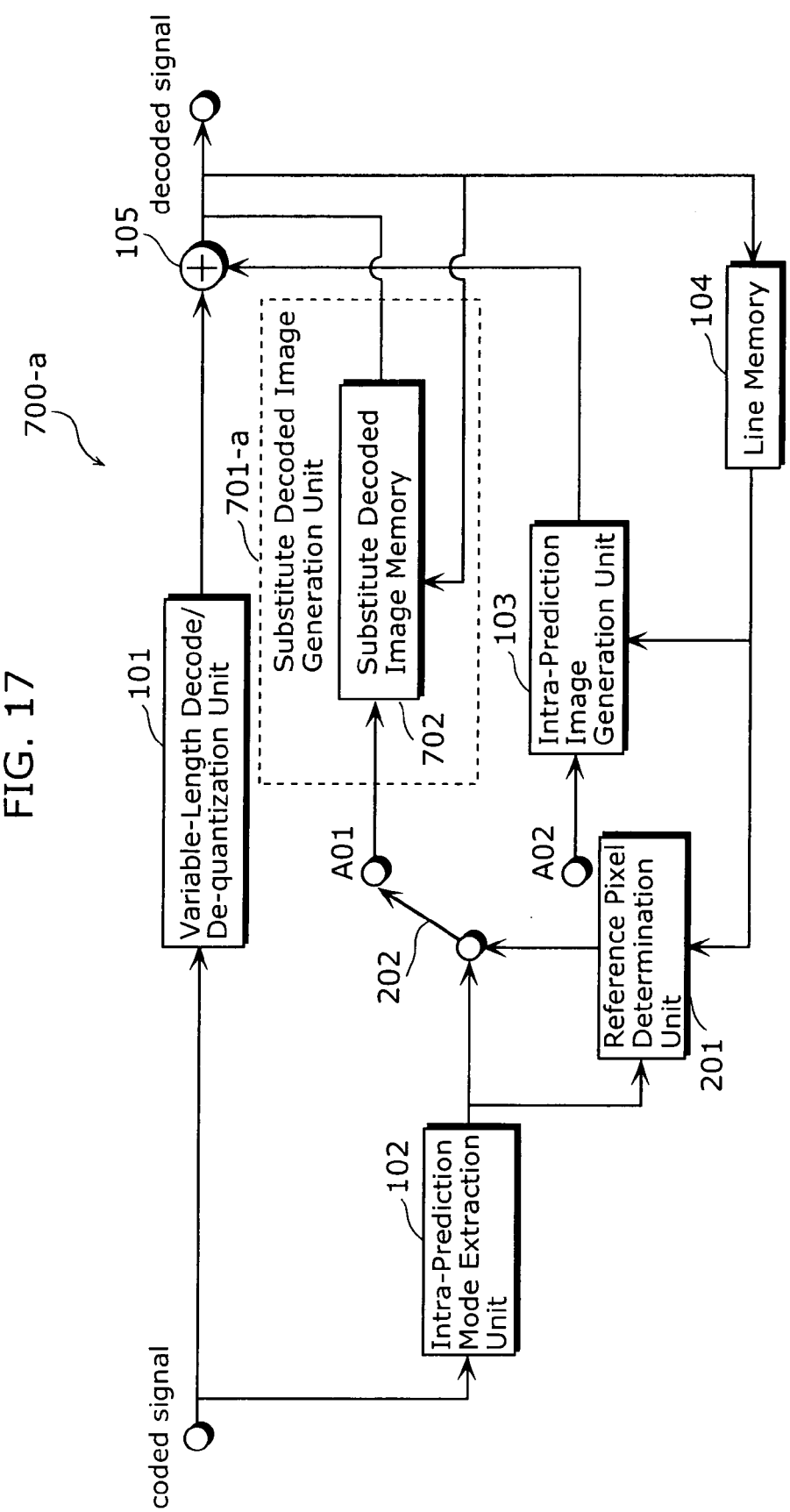
FIG. 17 is a block diagram showing a substitute decoded image memory according to the second embodiment of the present invention, in which another decoded block image is stored.

Regarding a block image to be stored in the substitute decoded image memory 702, like an image decoding apparatus 700-*a* shown in FIG. 17, the output of the adder 105 may be connected to the substitute decoded image memory 702 so as to store a block image within the same picture, or a block image of another picture, both of which have been generated.

Although this embodiment relates to the case in which a substitute decoded image is given as an image stored in the substitute decoded image memory, an image obtained by calculation may also be stored.

This allows a decoding process to be continued even in the case where an intra prediction mode is specified, in which an unavailable pixel is necessary as a reference pixel, due to a coding error, a transmission error, or the like, by outputting an image stored in the substitute decoded image memory 702 as decoded signals.

Any one of the options proposed above is not limited to this embodiment.

Third Embodiment

Figure 18:
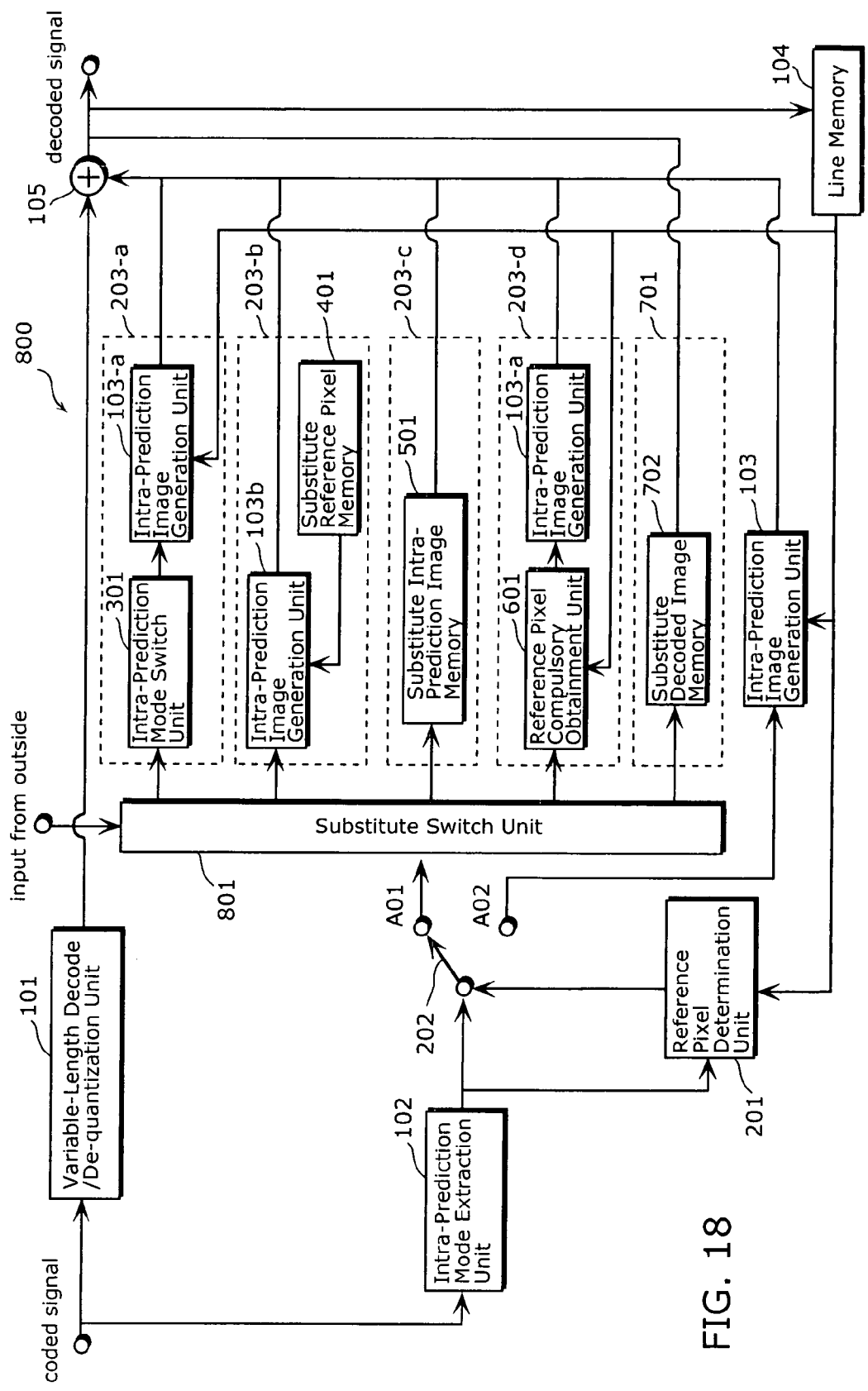
FIG. 18 is a block diagram showing the structure of an image decoding apparatus according to a third embodiment of the present invention.

FIG. 18 is a block diagram showing the structure of an image decoding apparatus 800 according to a third embodiment of the present invention. In FIG. 18, the same elements as those shown in FIG. 4 to FIG. 17 are assigned the same reference numbers, and descriptions thereof are omitted here.

In this embodiment, as shown in FIG. 18, an image decoding apparatus 800 includes a substitute switch unit 801 on the side of a switch terminal A01. To the substitute switch unit 801, any plurality of substitute intra-prediction image generation units 203-*a* to 203-*d* described in the first embodiment and the substitute decoded image generation units 701 and 701-*a* described in the second embodiment, are connected.

When a reference pixel determination unit 201 determines that a reference pixel necessary for an intra prediction mode specified in a stream, is unavailable, the switch unit 202 is connected to the switch terminal A01, thereby operating the substitute switch unit 801.

The substitute switch unit 801 selects one from the connected substitute intra-prediction image generation units and substitute decoded image memories, according to an external input, and then switches to the selected one.

This allows optimal one to be selected from the substitute intra-prediction image generation units and the substitute decoded image generation units, by giving an external input as circumstances demand, even in the case where a wrong intra prediction mode is specified in a stream.

Figure 19:
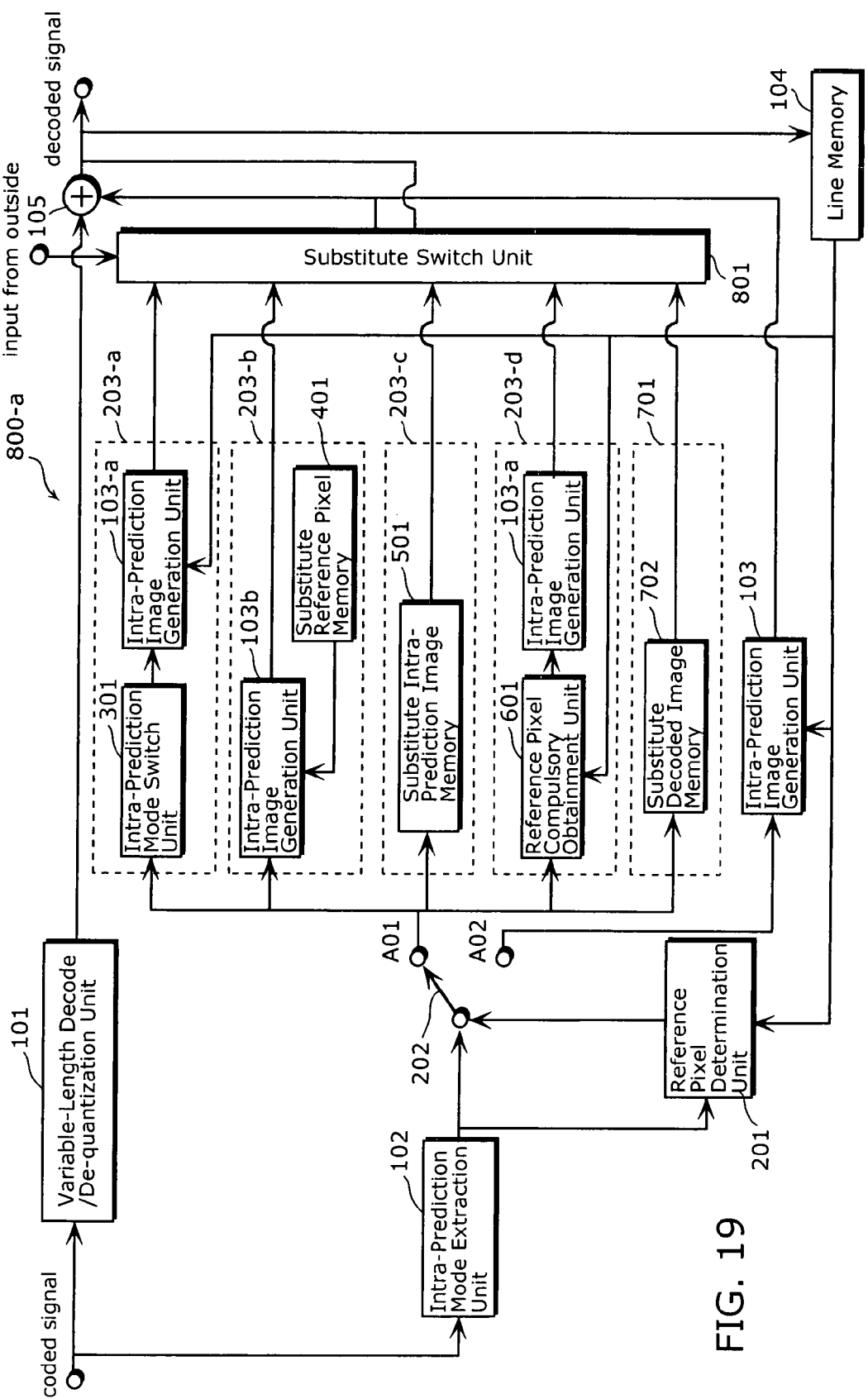
FIG. 19 is a block diagram showing a substitute switch unit according to the third embodiment of the present invention, in which a selection is made out of substitute intra-prediction and substitute decoded image results.

Referring to FIG. 19, to an image decoding apparatus 800-*a*, one or more substitute intra-prediction image generation units and substitute decoded image generation unit connected on the side of a switch terminal A01. To the output destinations of the substitute intra-prediction image generation units and the substitute decoded image generation units, the substitute switch unit 801 is connected. The substitute switch unit 801 selects one, based on an external input, from inputted substitute intra-prediction and substitute decoded images, and outputs the selected one as an intra-prediction image or a decoded image. This means that one is selected from substitute intra-prediction image results and substitute decoded image results, based on an external input. Such an image decoding apparatus is effective, which is capable of selecting an optimal one from a plurality of substitute intra-prediction and substitute decoded image results, based on an external input so as to output the selected optimal one.

When the substitute switch unit 801 makes a selection, switching may be performed not by an external input, but by an internal determination. Examples of determination methods include the following one. Once all the substitute intra-prediction image generation units and the substitute decoded image generation units are operated to generate decoded images. All the image results are compared with a plurality of pictures which have been already decoded. Switching is then performed to the one where an optimal result is obtained, among the substitute intra-prediction image generation units and the substitute decoded image generation units.

Any one of the optional methods proposed above is not limited to this embodiment.

The memory described in each of the above embodiments is not limited to a "memory". Any type is applicable as long as it works as a memory element. The line memory 104 may be connected to the adder 105 indirectly through a frame memory which stores decoded pictures, or the like.

Each functional block such as the reference pixel determination unit 201, the substitute intra-prediction image generation unit 203, or the substitute switch unit 801 described in the above embodiments, is typically implemented as an LSI, or equivalently, an integrated circuit. All the functional blocks or some thereof may be implemented in the form of a single chip.

Although, referred to as LSI here, it may also be referred to as an IC, system LSI, super LSI, and ultra-LSI, depending on the degree of integration.

Furthermore, the technique for implementation as an integrated circuit is not limited to an LSI. Implementation through a purpose-built circuit or a general-purpose processor is also possible. It is also possible to employ a Field Programmable Gate Array (FPGA) which can be programmed, and a reconfigurable processor in which connections and settings of circuit cells within an LSI can be reconfigured, even after manufacturing the LSI.

In addition, when integrated circuit technology replacing the LSI appears as a result of developments in semiconductor technology or as an offshoot of different technology, it goes without saying that integration of the function blocks can be carried out employing such technology. Biotechnology or the like is likely to be applied to this field.

INDUSTRIAL APPLICABILITY

The image decoding method and the image decoding apparatus in the present invention is useful for decoding a still picture or a moving picture in a DVD apparatus, a video-phone, a personal computer, a mobile phone, and the like.

The invention claimed is:

1. An image decoding apparatus which decodes an image coded signal which is generated by dividing an image into one or more blocks and then coding the one or more blocks, said image decoding apparatus comprising:
    an extraction unit configured to extract, from the image coded signal, intra-prediction mode information that indicates which intra-prediction mode among a plurality of intra-prediction modes is used to intra-code a current block;
    a reference pixel determination unit configured to determine whether or not the intra-prediction mode information has an error by determining whether or not a reference block necessary for the intra-prediction mode indicated by the intra-prediction mode information exists in one of (i) a picture including the current block and (ii) a slice including the current block; and
    an intra image decoding substitute unit configured to switch the intra-prediction mode to another intra-prediction mode, and generate a decoded image of the current block using the other intra-prediction mode, when said reference pixel determination unit determines that the necessary reference block does not exist in one of the picture including the current block and the slice including the current block.

2. The image decoding apparatus according to claim 1, wherein said intra image decoding substitute unit includes:
    a substitute intra-prediction image generation unit configured to switch the intra-prediction mode indicated by the intra-prediction mode information to the other intra-prediction mode, and generate a substitute intra-prediction image using the other intra-prediction mode; and
    a decoded image generation unit configured to generate the decoded image using the generated substitute intra-prediction image.

3. The image decoding apparatus according to claim 2, wherein said substitute intra-prediction image generation unit includes:
    an intra-prediction mode switch unit configured to switch the intra-prediction mode indicated by the intra-prediction mode information to the other intra-prediction mode, when said reference pixel determination unit determines that the necessary reference block does not exist in one of the picture including the current block and the slice including the current block; and
    an intra-prediction image generation unit configured to generate the substitute intra-prediction image using the other intra-prediction mode.

4. The image decoding apparatus according to claim 3, wherein said intra-prediction mode switch unit is configured to switch the other intra-prediction mode to an average value prediction mode.

5. The image decoding apparatus according to claim 3, wherein said intra-prediction mode switch unit is configured to switch (i) the intra-prediction mode indicated by the intra-prediction mode information to (ii) a prediction mode by which a block except an immediately-left block is referred to, when the immediately-left block is unavailable, or switch (i) the intra-prediction mode indicated by the intra-prediction mode information to (iii) a prediction mode by which a block except an immediately-above block is referred to, when the immediately-above block is unavailable, the immediately-left block and the immediately-above block being adjacent to the current block and positioned on immediately left of and above the current block, respectively.

6. An image decoding method of decoding an image coded signal which is generated by dividing an image into one or more blocks and then coding the one or more blocks, said image decoding method comprising:
    extracting, from the image coded signal, intra-prediction mode information that indicates which intra-prediction mode among a plurality of intra-prediction modes is used to intra-code a current block;
    determining whether or not the intra-prediction mode information has an error by determining whether or not a reference block necessary for the intra-prediction mode indicated by the intra-prediction mode information exists in one of (i) a picture including the current block and (ii) a slice including the current block; and
    switching the intra-prediction mode to another intra-prediction mode, and generating a decoded image of the current block using the other intra-prediction mode, when said determining determines that the necessary reference block does not exist in one of the picture including the current block and the slice including the current block.

7. A non-transitory computer readable recording medium having stored thereon a program for decoding an image coded signal which is generated by dividing an image into one or more blocks and then coding the one or more blocks, wherein, when executed, said program causes a computer to execute a method comprising:

extracting, from the image coded signal, intra-prediction mode information that indicates which intra-prediction mode among a plurality of intra-prediction modes is used to intra-code a current block;

determining whether or not the intra-prediction mode information has an error by determining whether or not a reference block necessary for the intra-prediction mode indicated by the intra-prediction mode information exists in one of (i) a picture including the current block and (ii) a slice including the current block; and switching the intra-prediction mode to another intra-prediction mode, and generating a decoded image of the current block using the other intra-prediction mode, when said determining determines that the necessary reference block does not exist in one of the picture including the current block and the slice including the current block.

8. An integrated circuit which decodes an image coded signal which is generated by dividing an image into one or more blocks and then coding the one or more blocks, said integrated circuit comprising:

an extraction unit configured to extract, from the image coded signal, intra-prediction mode information that indicates which intra-prediction mode among a plurality of intra-prediction modes is used to intra-code a current block;

a reference pixel determination unit configured to determine whether or not the intra-prediction mode information has an error by determining whether or not a reference block necessary for the intra-prediction mode indicated by the intra-prediction mode information exists in one of (i) a picture including the current block and (ii) a slice including the current block; and an intra image decoding substitute unit configured to switch the intra-prediction mode to another intra-prediction mode, and generate a decoded image of the current block using the other intra-prediction mode, when said reference pixel determination unit determines that the necessary reference block does not exist in one of the picture including the current block and the slice including the current block.

* * * * *